United States Patent
Fujimoto et al.

[11] Patent Number: 5,930,227
[45] Date of Patent: Jul. 27, 1999

[54] OPTICAL DISK HAVING AN EVALUATION PATTERN FOR EVALUATING THE OPTICAL DISK

[75] Inventors: Sadanari Fujimoto, Koishikawa; Hiroharu Satoh, Hongo, both of Japan

[73] Assignee: Kabushiki Kaisha Toshiba, Kawasaki, Japan

[21] Appl. No.: 08/903,691

[22] Filed: Jul. 31, 1997

Related U.S. Application Data

[62] Division of application No. 08/630,615, Apr. 10, 1996, Pat. No. 5,696,756.

[30] Foreign Application Priority Data

Apr. 14, 1995 [JP] Japan .................................. 7-089806
Apr. 14, 1995 [JP] Japan .................................. 7-089807

[51] Int. Cl.$^6$ .................................................. G11B 7/24
[52] U.S. Cl. .............................. 369/275.4; 369/275.3; 369/58
[58] Field of Search ........................ 369/275.4, 275.3, 369/58, 13, 275.1, 59, 124, 44.32, 44.26, 275.2, 48, 44.29, 44.34, 116, 274, 276

[56] References Cited

U.S. PATENT DOCUMENTS

| | | | |
|---|---|---|---|
| Re. 33,506 | 12/1990 | Yamaguchi | 369/58 |
| 4,494,226 | 1/1985 | Hazel | 369/44.26 |
| 4,502,134 | 2/1985 | Kondo | 369/44.32 |
| 4,545,044 | 10/1985 | Satoh | 369/32 |
| 4,611,317 | 9/1986 | Takeuchi | 369/44.34 |
| 4,636,628 | 1/1987 | Tsukai | 250/201 |
| 4,680,744 | 7/1987 | Kanamaru | 369/44.32 |
| 4,780,865 | 10/1988 | Yamakawa | 369/44.32 |
| 4,805,164 | 2/1989 | Yamaguchi | 369/44.32 |
| 4,873,680 | 10/1989 | Chung et al. | 369/59 |
| 4,979,159 | 12/1990 | Tsuruoka | 369/58 |
| 4,991,162 | 2/1991 | Tabe | 369/58 |
| 5,056,075 | 10/1991 | Maruta | 369/44.29 |
| 5,206,847 | 4/1993 | Kanda | 369/44.13 |
| 5,297,131 | 3/1994 | Tanaka | 369/275.2 |
| 5,396,479 | 3/1995 | Johann | 369/59 |
| 5,502,573 | 3/1996 | Fujinami | 358/339 |
| 5,535,008 | 7/1996 | Yamagishi | 358/342 |
| 5,546,367 | 8/1996 | Yoshimura | 369/44.32 |
| 5,546,368 | 8/1996 | Lee | 369/47 |
| 5,561,649 | 10/1996 | Lee | 369/47 |
| 5,696,756 | 12/1997 | Fujimoto et al. | 369/275.4 |

FOREIGN PATENT DOCUMENTS

| | | |
|---|---|---|
| 0 575 963 A2 | 12/1993 | European Pat. Off. . |
| 0 587 111 A1 | 3/1994 | European Pat. Off. . |
| 0 595 322 A1 | 5/1994 | European Pat. Off. . |
| 0 621 589 A1 | 10/1994 | European Pat. Off. . |
| 39 33018 A1 | 4/1990 | Germany . |
| 2-292726 | 12/1990 | Japan . |
| 3-34127 | 2/1991 | Japan . |
| 4102201 | 1/1992 | Japan . |
| 629439 | 10/1994 | Japan . |
| 8-129458 | 5/1996 | Japan . |
| 8-129753 | 5/1996 | Japan . |
| 8-167149 | 6/1996 | Japan . |
| 8-167150 | 6/1996 | Japan . |

OTHER PUBLICATIONS

Yoshida et al., "An Optical Digital Memory Using Tellurium Sub–oxide Thin Film Disc", *Proceedings of SPIE*, vol. 421, Jun. 8–9,1983, pp. 79–84.

(List continued on next page.)

*Primary Examiner*—Ali Neyzari
*Attorney, Agent, or Firm*—Pillsbury Madison & Sutro LLP

[57] ABSTRACT

Pits and lands which have a pit length of 3T, a land length of *6T, a pit length of 7T, a land length of *3T, a pit length of 6T and a land length of *7T are alternately formed in a lead-in area in an inner track area on an optical disk as a test pattern for evaluating a read error of the optical disk. This test pattern data is reproduced by a reproducing system to detect an error rate, a compensation coefficient for minimizing the error rate is acquired, and a reproduction signal is compensated by using this compensation coefficient so that the reproduction signal is reproduced with the minimized error rate by the reproducing system.

40 Claims, 17 Drawing Sheets

OTHER PUBLICATIONS

Japanese Patent Abstract, Jan. 1992, No. 10220.
Patent Abstracts of Japan, Oct. 1994, No. 06295439 A.
Patent Abstracts of Japan, Oct. 1994, No. 06282952 A.
Patent Abstracts of Japan, Mar. 1996, No. 08063751 A.
Japanese Patent Abstract, Jun. 1986, No. 61–122932.
Japanese Patent Abstract, Mar. 1994, No. 6–84173.
Japanese Patent Abstract, Dec. 1991, No. 3–276446.
Japanese Patent Abstract, Jun. 1989, No. 1–154321
Japanese Patent Abstract, Feb. 1994, No. 6–28675.
Japanese Patent Abstract, Jan. 1993, No. 5–12669.
Japanese Patent Abstract, May 1993, No. 5–114139.
Japanese Patent Abstract, Aug. 1993, No. 5–217215.
Japanese Patent Abstract, Jun. 1994, No. 6–176368.
Japanese Patent Abstract, Sep. 1994, No. 6–243471.
Japanese Patent Abstract, Apr. 1992, No. 4–114371.
Patent Abstracts of Japan, Jan. 1995, No. 07014213 A.
Patent Abstracts of Japan, Mar. 1995, No. 07065378 A.
Patent Abstracts of Japan, Mar. 1995, No. 07073470 A.
Patent Abstracts of Japan, Mar. 1995, No. 07073471 A.
Patent Abstracts of Japan, Jun. 1995, No. 07141660 A.
Patent Abstracts of Japan, Feb. 1995, No. 08045101 A.
Patent Abstracts of Japan, Mar. 1996, No. 08077707 A.
Patent Abstracts of Japan, Jan. 1995, No. 07029178 A.

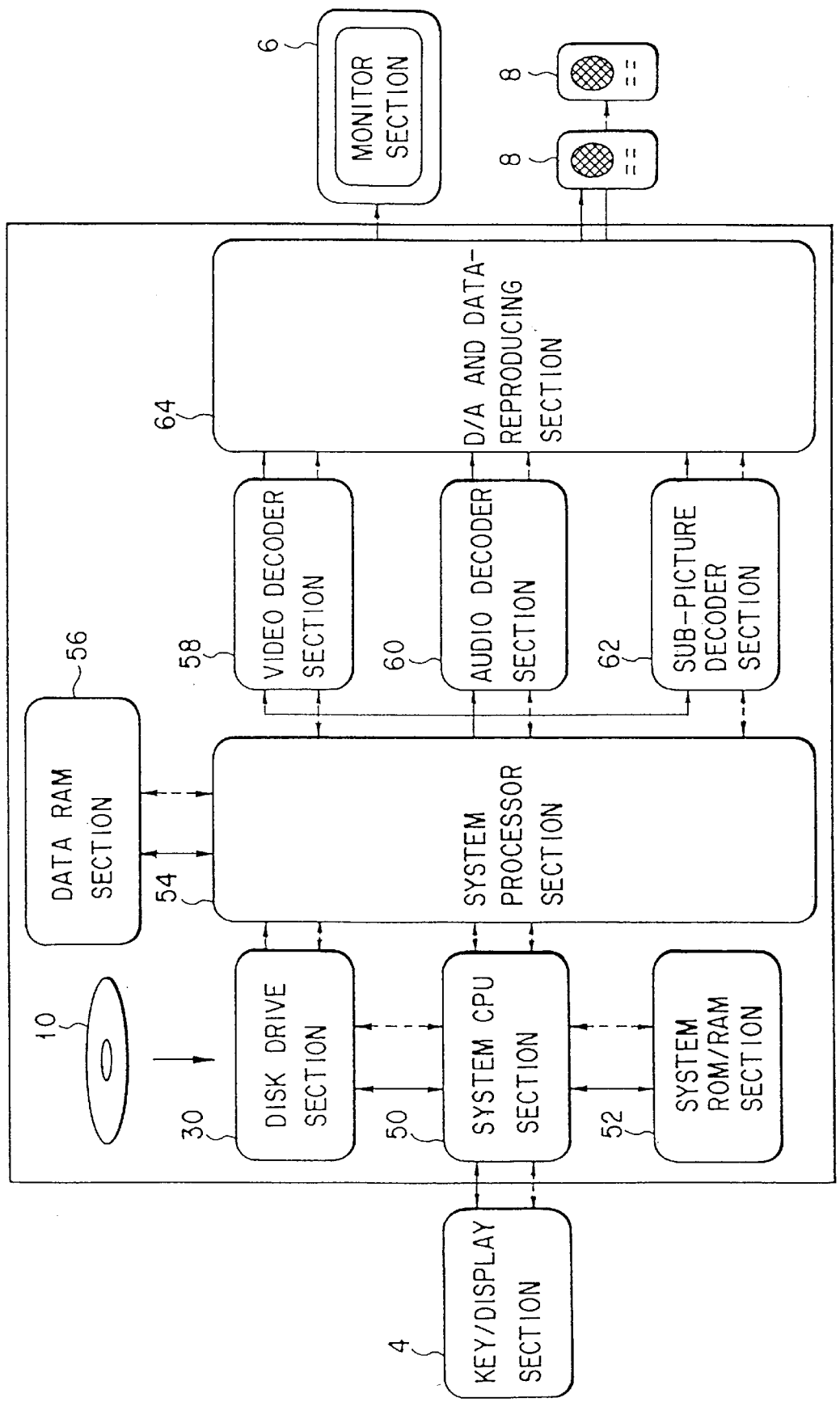
F I G. 1

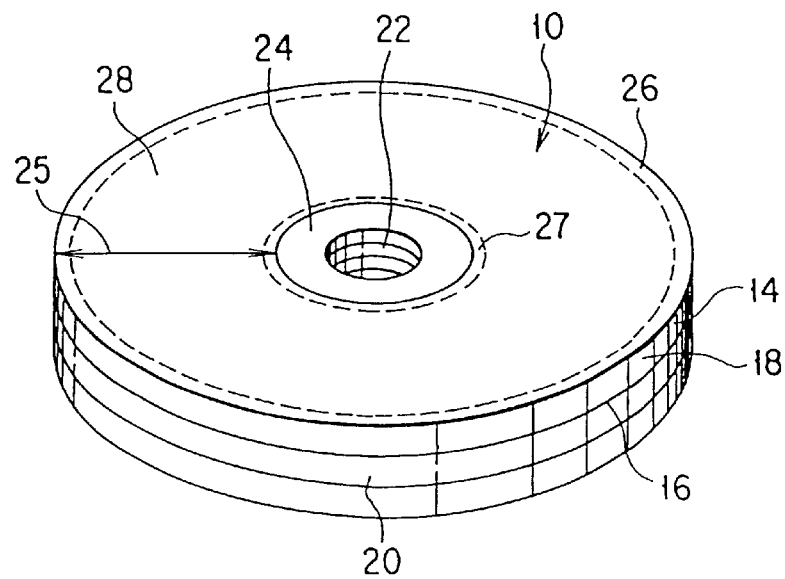
F I G. 3
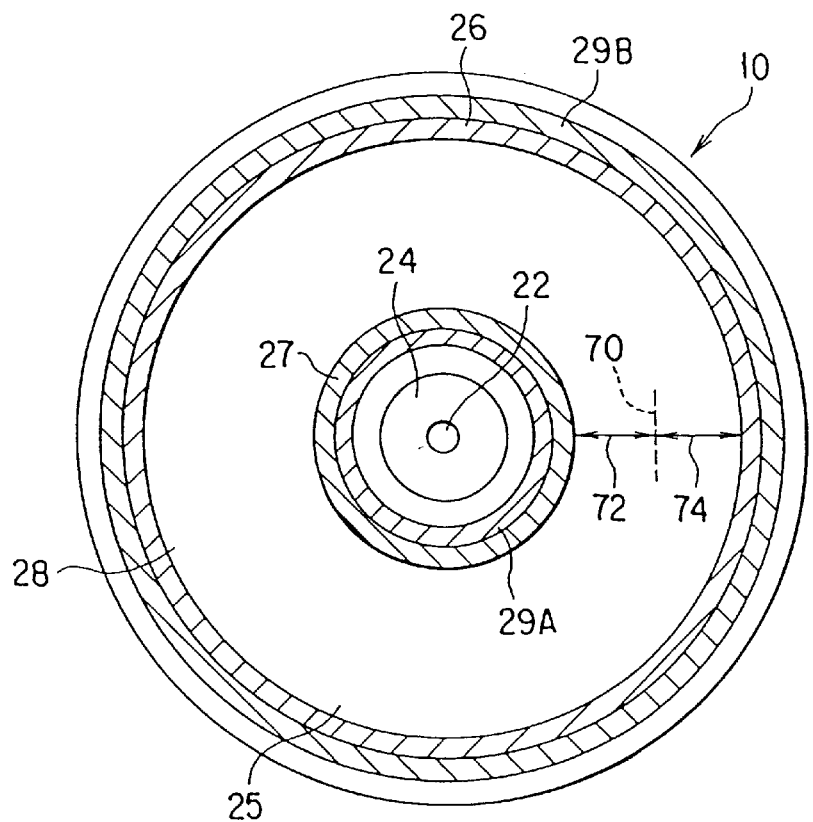
F I G. 4

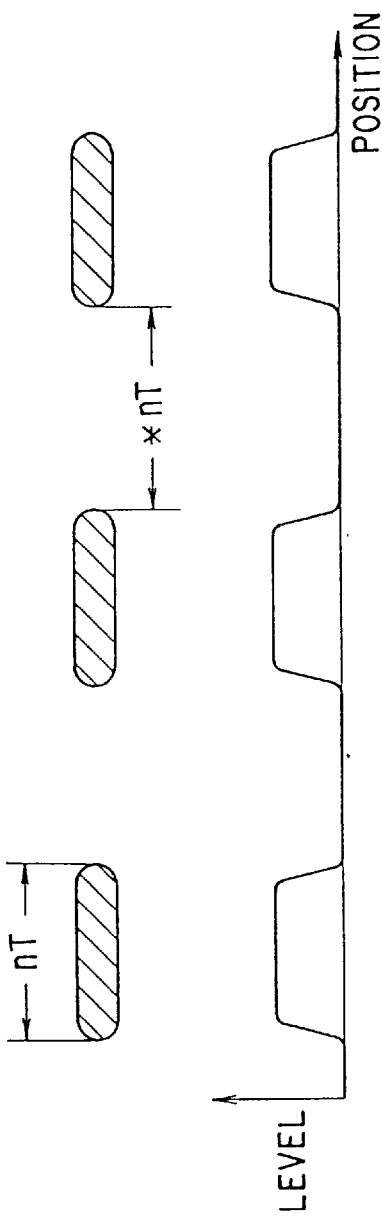
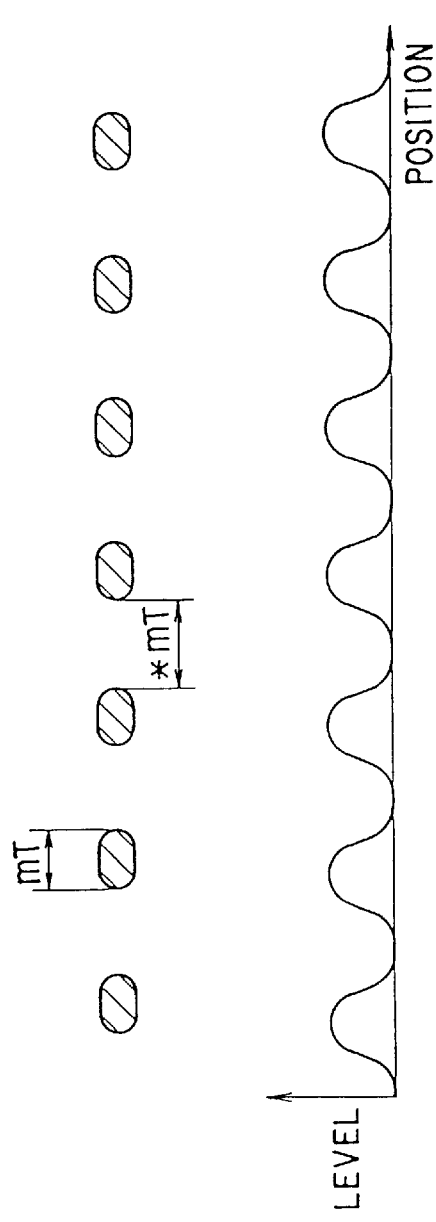
FIG. 5A
FIG. 5B
FIG. 6A
FIG. 6B

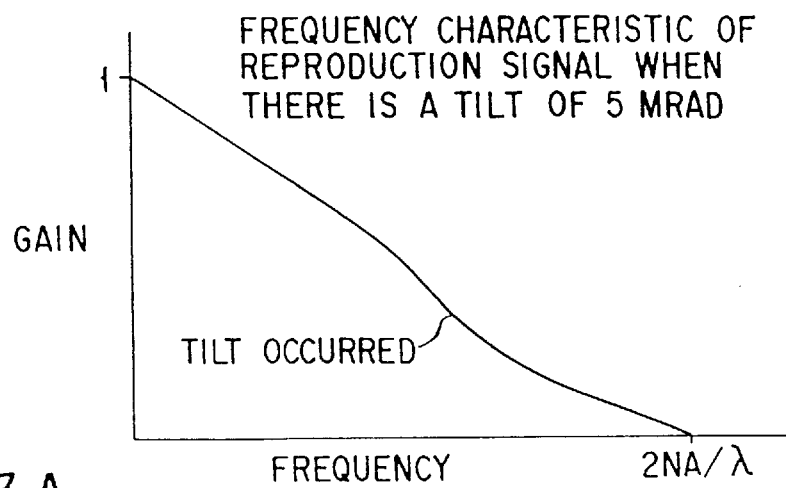
F I G. 13A
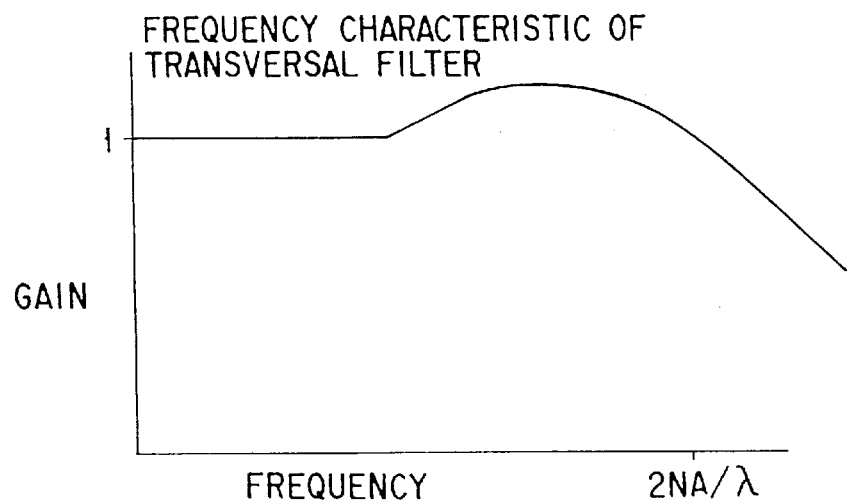
F I G. 13B
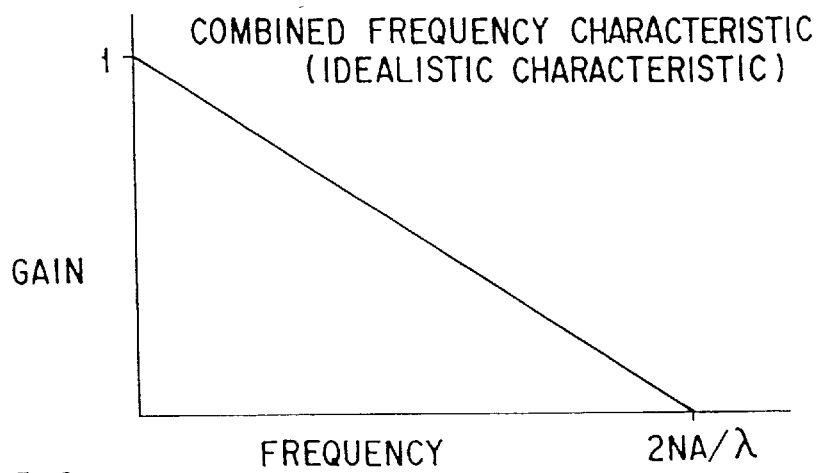
F I G. 13C

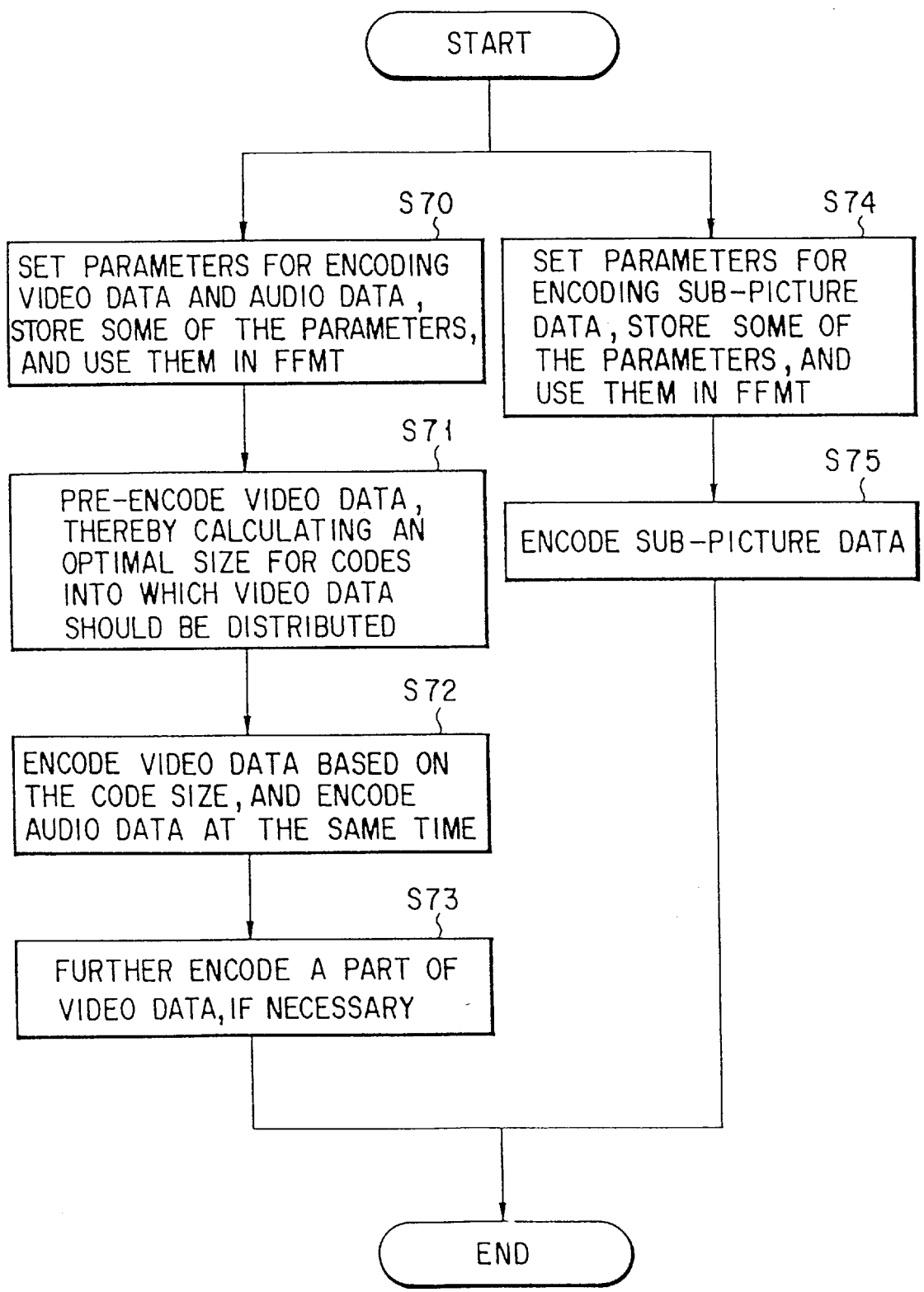
F I G. 19

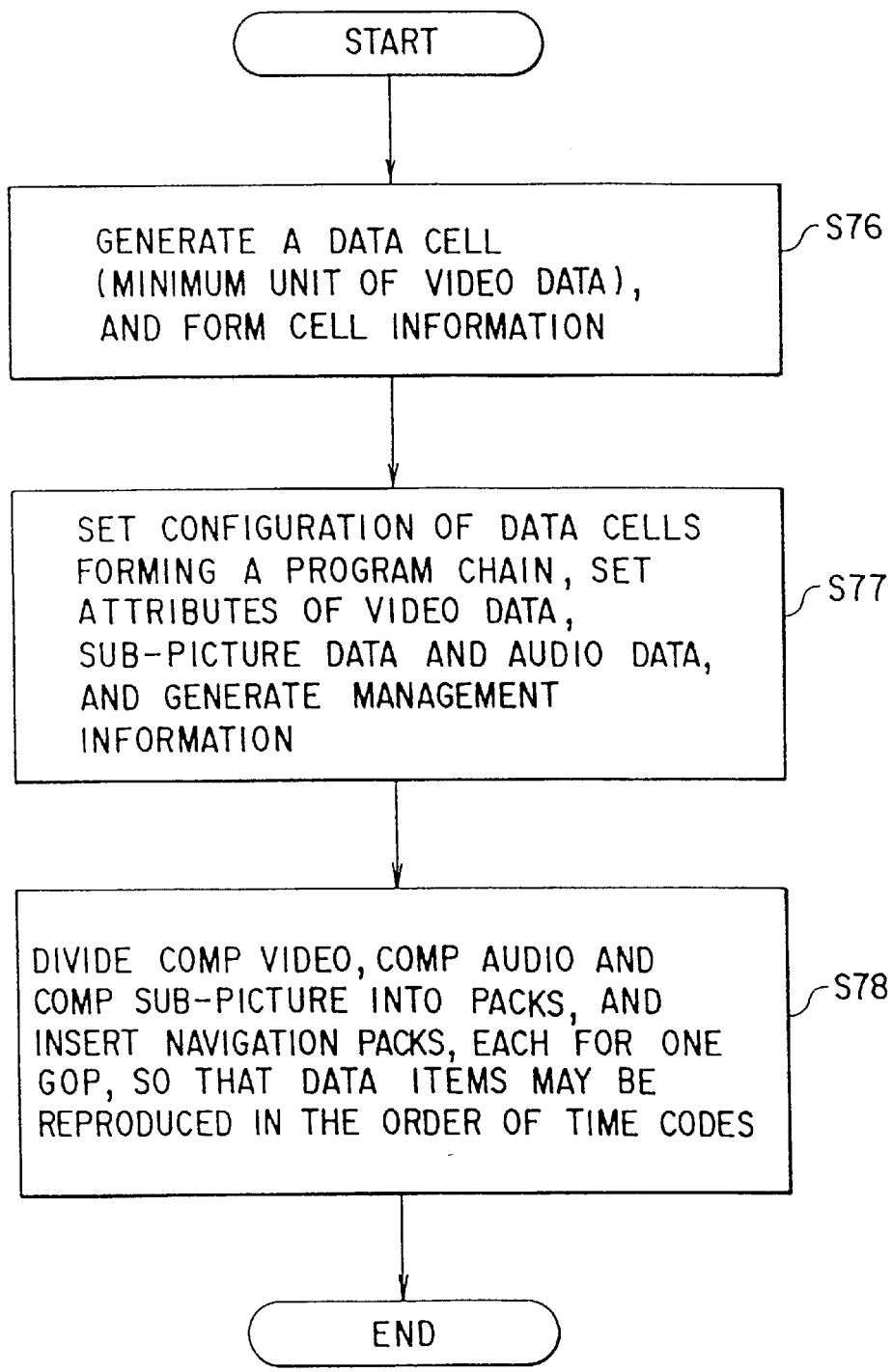
F I G. 20

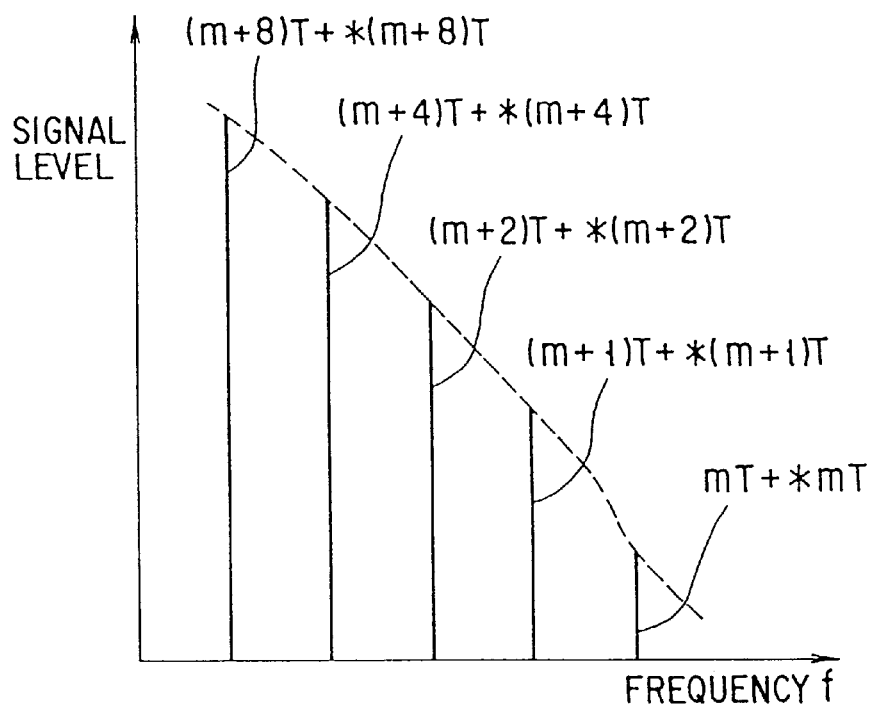
F I G. 26
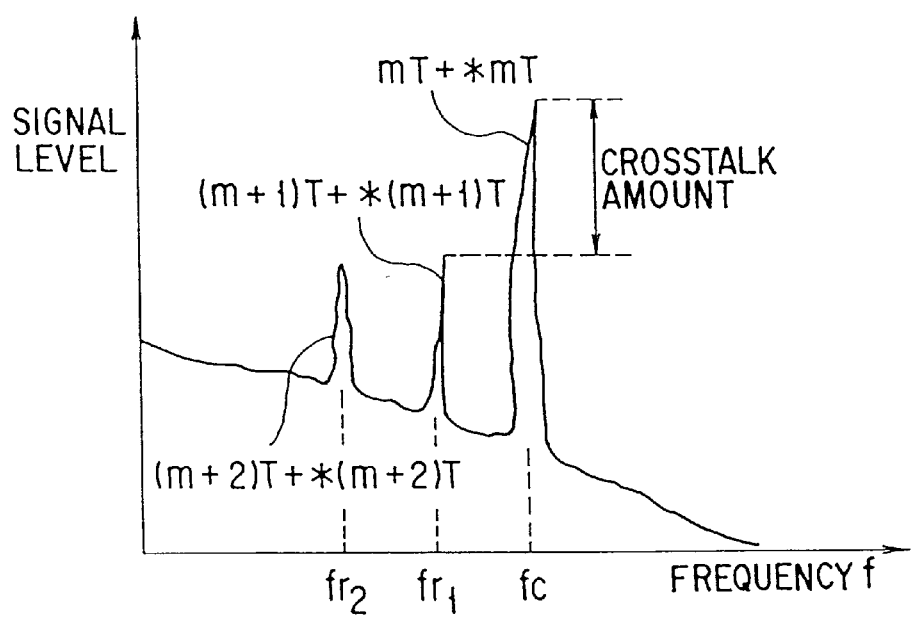
F I G. 27

OPTICAL DISK HAVING AN EVALUATION PATTERN FOR EVALUATING THE OPTICAL DISK

This is a division of application Ser. No. 08/630,615, filed Apr. 10, 1996 now U.S. Pat. No. 5,696,756.

BACKGROUND OF THE INVENTION

1. Field of the Invention

The present invention relates to an optical disk, a recording method and data recording apparatus for recording data on this optical disk, and a data reproducing method and data reproducing apparatus for reproducing data from the optical disk. More particularly, an optical disk on which a detection signal for permitting the detection of a tilt amount is recorded, a recording method and data recording apparatus for recording data together with a tilt amount detection signal on this optical disk, and a data reproducing method and data reproducing apparatus for detecting the tilt amount detection signal from the optical disk to reproduce data therefrom.

This invention also relates to an optical disk having an evaluation test pattern, a recording method and data recording apparatus for recording reproduction data together with evaluation test data on this optical disk, and a method and apparatus for reading evaluation data from the optical disk to evaluate the optical disk. More particularly, this invention relates to an optical disk on which an evaluation test pattern, for determining whether or not a manufactured optical disk is defective, is recorded, a recording method and recording apparatus for recording reproduction data together with an evaluation test pattern on this optical disk, and a method and apparatus for detecting an evaluation test pattern signal from the optical disk to determine if the optical disk is defective.

2. Description of the Related Art

With regard to optical disk apparatuses, as one type of information recording and reproducing apparatus, which optically reproduce information, it is known that the greater the relative tilt amount between the disk reproducing surface and the surface of an objective lens becomes, the more the frequency characteristic of reproduced signals is deteriorated so that the error rate at the time of reading data becomes impaired. This relative tilt amount is determined by the tilt caused by the physical deformation of a disk and the tilt caused by the physical inclination of the objective lens of an optical head.

To overcome such a problem, there is a conventional method of mechanically tilting the optical head to cancel the relative tilt of the disk reproducing surface and the surface of the objective lens as disclosed in, for example, Jpn. Pat. Appln. KOKAI Publication No. 3-142723. This conventional apparatus has an optical pickup supported in a tiltable manner and mechanically coupled to a motor as a tilting source via a gear. This apparatus detects the tilt amount of an optical disk and drives the motor according to the tilt amount to incline the optical pickup via the gear, so that the relative tilt amount between the objective lens and the optical disk is controlled. Such a control system is considered sufficient to cancel the relative tilt between the disk's reproducing surface and the surface of the objective lens.

Because an apparatus which employs such a conventional control system has mechanical components, such as the motor and gear in the control system, tilt compensation control in a high band is difficult and tilt cannot be compensated in bands other than the control band in the vicinity of the DC component range. Further, the use of the mechanical components makes it difficult to design the apparatus compact. As optical disks capable of recording a vast amount of information at higher density are being developed today, particularly, the tilt compensation in the DC component range alone becomes insufficient, and people are demanding a system which can accurately accomplish tilt compensation in a high band as well as in the DC component range.

For optical disk apparatuses, as one type of information recording and reproducing apparatus, which optically reproduce data, it is premised that data should be recorded at high precision on an optical disk in order to reproduce data at high accuracy. If the forming precision of pits formed on an optical disk is poor, for example, signals would not be reproduced at a high precision or at a low error rate so that data reproduction may become disabled. It is also known that if the frequency characteristics of reproduced signals becomes poor, the error rate at the time of reading data becomes impaired while if there is a significant crosstalk component from adjoining rows of pits, retrieval data cannot be acquired from a target row of pits.

While there has been a demand for the system which determine at high precision if manufactured optical disks are defective, it is considered sufficient for the actual reproduction system to check recorded data on an optical disk which does not have a relatively large storage capacity in order to determine whether or not data recording is satisfactory. As optical disks capable of recording a vast amount of and high-density information are being developed today, however, people demand a system which can determine at high precision if data recording has failed.

SUMMARY OF THE INVENTION

Accordingly, it is the primary object of the present invention to provide an optical disk which can optimize the characteristics of reproduced signals even if a relative tilt occurs between the reproducing surface of the disk and the surface of the objective lens.

It is the second object of the present invention to provide a recording method for recording on an optical disk a test pattern which can optimize the characteristics of reproduced signals even if a relative tilt occurs between the reproducing surface of the disk and the surface of the objective lens.

It is the third object of the present invention to provide a recording apparatus for recording on an optical disk a test pattern which can optimize the characteristics of reproduced signals even if a relative tilt occurs between the reproducing surface of the disk and the surface of the objective lens.

It is the fourth object of the present invention to provide a data reproducing method for reproducing from an optical disk a test pattern which can optimize the characteristics of reproduced signals even if a relative tilt occurs between the reproducing surface of the disk and the surface of the objective lens, to thereby optimize reproduction data.

It is the fifth object of the present invention to provide a data reproducing apparatus for reproducing from an optical disk a test pattern which can optimize the characteristics of reproduced signals even if a relative tilt occurs between the reproducing surface of the disk and the surface of the objective lens, to thereby optimize reproduction data.

It is the sixth object of the present invention to provide an optical disk recorded with an evaluation pattern for permitting the high-precision determination of whether recorded data is proper.

It is the seventh object of the present invention to provide a method of recording on an optical disk reproduction data together with an evaluation pattern for permitting the highly-accurate determination of the properness of recorded data.

It is the eighth object of the present invention to provide an apparatus of recording on an optical disk reproduction data together with an evaluation pattern for permitting the highly-accurate determination of the properness of recorded data.

It is the ninth object of the present invention to provide a method of reproducing an evaluation pattern for permitting the highly-accurate determination of the properness of recorded data, to thereby determine if an optical disk is defective.

It is the tenth object of the present invention to provide an apparatus of reproducing an evaluation pattern for permitting the highly-accurate determination of the properness of recorded data, to thereby determine if an optical disk is defective.

According to the first aspect of this invention, an optical disk comprises:

a data area on which data is recorded in a pattern of pits and non-pits, the pits having one of a shortest pit length (mT), a longest pit length (nT) and a predetermined pit length between the shortest pit length (mT) and the longest pit length (nT) where T is a channel pit length and n and m are integers, the non-pits having one of a shortest non-pit length (*mT), a longest non-pit length (*nT) and a predetermined non-pit length between the shortest non-pit length (*mT) and the longest non-pit length (*nT); and a test pattern area provided outside the data area and recorded with a test pattern including a shortest pit row having repeated combinations of shortest pits and shortest non-pits, a longest pit row having repeated combinations of longest pits and longest non-pits, and a predetermined pit row having repeated combinations of pits having a predetermined pit length between the shortest pit length (mT) and the longest pit length (nT) and non-pits corresponding to the pits.

According to the second aspect of this invention, an optical disk system comprises:

reading means for optically reading a test pattern and data as reproduction signals from an optical disk including a data area having pits and non-pits arranged in accordance with record data, and the test pattern having the pits and non-pits arranged based on a predetermined arrangement rule;

detection means for detecting a compensation coefficient specific to the apparatus, from a reproduction signal read from the test pattern; and compensation means for compensating a reproduction signal read from the data recording area with the compensation coefficient.

According to the third aspect of this invention, a method comprises the steps of:

optically reading a test pattern and data as reproduction signals from an optical disk including a data area having pits and non-pits arranged in accordance with record data, and the test pattern having the pits and non-pits arranged based on a predetermined arrangement rule;

detecting a compensation coefficient specific to the apparatus, from a reproduction signal read from the test pattern; and compensating a reproduction signal read from the data recording area with the compensation coefficient.

According to the fourth aspect of this invention, a recording method of recording data on an optical disk comprises:

a data conversion step of converting data to be recorded to pit data equivalent to a pattern of pits and non-pits, the pits having one of a shortest pit length (mT), a longest pit length (nT) and a predetermined pit length between the shortest pit length (mT) and the longest pit length (nT) where T is a channel pit length and n and m are integers, the non-pits having one of a shortest non-pit length (*mT), a longest non-pit length (*nT) and a predetermined non-pit length between the shortest non-pit length (*mT) and the longest non-pit length (*nT);

a step of generating a test signal equivalent to a test pattern including a shortest pit row having repeated combinations of shortest pits and shortest non-pits, a longest pit row having repeated combinations of longest pits and longest non-pits, and a predetermined pit row having repeated combinations of pits having a predetermined pit length between the shortest pit length (mT) and the longest pit length (nT) and non-pits corresponding to the pits; and a step of recording the pit data in a data recording area on the optical disk and the test signal in a test pattern area different from the data recording area on the optical disk, both in a pattern of the pits and non-pits.

According to the fifth aspect of this invention, a recording apparatus for recording data on an optical disk comprises:

data conversion means for converting data to be recorded to pit data equivalent to a pattern of pits and non-pits, the pits having one of a shortest pit length (mT), a longest pit length (nT) and a predetermined pit length between the shortest pit length (mT) and the longest pit length (nT) where T is a channel pit length and n and m are integers, the non-pits having one of a shortest non-pit length (*mT), a longest non-pit length (*nT) and a predetermined non-pit length between the shortest non-pit length (*mT) and the longest non-pit length (*nT);

test signal generation means for generating a test signal equivalent to a test pattern including a shortest pit row having repeated combinations of shortest pits and shortest non-pits, a longest pit row having repeated combinations of longest pits and longest non-pits, and a predetermined pit row having repeated combinations of pits having a predetermined pit length between the shortest pit length (mT) and the longest pit length (nT) and non-pits corresponding to the pits; and recording means for recording the pit data in a data recording area on the optical disk and the test signal in a test pattern area different from the data recording area on the optical disk, both in a pattern of the pits and non-pits.

According to the above-described optical disk, even if a relative tilt occurs between the reproducing surface of the optical disk and the surface of the objective lens, a reproduction signal can be optimized with a compensation coefficient according to the tilt amount. Therefore, the frequency characteristic of the reproduction signal is always optimized to ensure the improvement of the characteristic of the reproduction signal. This results in the improvement of the error rate at the time of reading data.

According to the sixth aspect of this invention, an optical disk comprises:

a data recording area on which data is recorded in a pattern of pits and non-pits, the pits having one of a shortest pit length (mT), a longest pit length (nT) and a predetermined pit length between the shortest pit length (mT) and the longest pit length (nT) where T is a channel pit length and n and m are integers, the non-pits having one of a shortest non-pit length (*mT), a longest non-pit length (*nT) and a predetermined non-pit length between the shortest non-pit length (*mT) and the longest non-pit length (*nT); and a test pattern area provided outside the data recording area and formed with a test pattern for determining a recording state of the optical disk recorded with a test pattern associated with a combination of shortest pits having the shortest pit length (mT), shortest non-pits having the shortest non-pit length (*mT), pits being selected from among pits having a predetermined pit length between the shortest pit length (mT) and the longest pit length (nT), and non-pits corresponding to the selected pits.

According to the seventh aspect of this invention, an optical disk evaluating apparatus comprises:

reading means for optically reading a test pattern and data as reproduction signals from an optical disk including a data recording area having pits and non-pits arranged in accordance with record data, and the test pattern having the pits and non-pits arranged based on a predetermined arrangement rule; and detection means for detecting evaluation data specific to an optical disk, from a reproduction signal read from the test pattern.

According to the eighth aspect of this invention, an optical disk evaluating method comprises:

a reading step of optically reading a test pattern and data as reproduction signals from an optical disk including a data recording area having pits and non-pits arranged in accordance with record data, and the test pattern having the pits and non-pits arranged based on a predetermined arrangement rule;

a detection step of detecting evaluation data specific to an optical disk, from a reproduction signal read from the test pattern; and a step of determining from the evaluation data if the optical disk is defective.

According to the ninth aspect of this invention, a recording method of recording data on an optical disk comprises:

a data conversion step of converting data to be recorded to pit data equivalent to a pattern of pits and non-pits, the pits having one of a shortest pit length (mT), a longest pit length (nT) and a predetermined pit length between the shortest pit length (mT) and the longest pit length (nT) where T is a channel pit length and n and m are integers, the non-pits having one of a shortest non-pit length (*mT), a longest non-pit length (*nT) and a predetermined non-pit length between the shortest non-pit length (*mT) and the longest non-pit length (*nT);

a step of generating a test signal equivalent to a test pattern provided outside the data recording area and associated with a combination of shortest pits having the shortest pit length (mT), shortest non-pits having the shortest non-pit length (*mT), pits being selected from among pits having a predetermined pit length between the shortest pit length (mT) and the longest pit length (nT), and non-pits corresponding to the selected pits;

a step of recording the pit data in a data recording area on the optical disk and the test signal in a test pattern area different from the data recording area on the optical disk, both in a pattern of the pits and non-pits.

According to the tenth aspect of this invention, a recording apparatus of recording data on an optical disk comprises:

data conversion means for converting data to be recorded to pit data equivalent to a pattern of pits and non-pits, the pits having one of a shortest pit length (mT), a longest pit length (nT) and a predetermined pit length between the shortest pit length (mT) and the longest pit length (nT) where T is a channel pit length and n and m are integers, the non-pits having one of a shortest non-pit length (*mT), a longest non-pit length (*nT) and a predetermined non-pit length between the shortest non-pit length (*mT) and the longest non-pit length (*nT);

test signal generation means for generating a test signal equivalent to a test pattern provided outside the data recording area and associated with a combination of shortest pits having the shortest pit length (mT), shortest non-pits having the shortest non-pit length (*mT), pits being selected from among pits having a predetermined pit length between the shortest pit length (mT) and the longest pit length (nT), and non-pits corresponding to the selected pits;

recording means for recording the pit data in a data recording area on the optical disk and the test signal in a test pattern area different from the data recording area on the optical disk, both in a pattern of the pits and non-pits.

With the use of the above-described optical disk, the properness of the formation of pits can be determined by detecting and evaluating a reproduction signal from a pit row of the shortest pits and the shortest non-pits and a pit row of the longest pits and the longest non-pits. It is possible to evaluate the frequency characteristic of a reproduction signal by evaluating a reproduction signal from the test pattern, which has a pit row (nT+*nT) having pits with the longest pit length (nT) and non-pits with the longest non-pit length (*nT) repeated, a pit row (mT+*mT) having pits with the shortest pit length (mT) and non-pits with the shortest non-pit length (*mT) repeated, and a pit row [(m+1)T+*(m+1)T], [(m+2)T+*(m+2)T], [(m+4)T+*(m+4)T] and [(m+8)T+*(m+8)T] equivalent to a pit row between a shortest pit length row (mT+*mT) and a predetermined pit length row and having pits having pit lengths (m+1)T, (m+2)T, (m+4)T and (m+8)T and non-pits having non-pit lengths *(m+1)T, *(m+2)T, *(m+4)T and *(m+8)T repeated, the latter pits lengths and non-pit lengths having no multiplication relation with one another between the shortest pit length row (mT+*mT) and the predetermined pit length row. It is also possible to evaluate the crosstalk characteristic of a reproduction signal by evaluating a reproduction signal from the test pattern in which the shortest pit length row (mT+*mT) is repeated over one track on the optical disk as a test pattern, and a pit length row [(m+1)T+*(m+1)T] and a pit length row [(m+2)T+*(m+2)T] are repeated over one track on the optical disk as a track adjacent to the shortest pit length row (mT+*mT) equivalent to the center track.

According to another first aspect of the invention, there is provided an optical disk comprising: a data recording area on which data is recorded in a pattern of pits and lands, the pits having one of a shortest pit length (3T), a longest pit length (kT) and a pit length between the shortest pit length (3T) and the longest pit length (kT) where T is a channel pit length, 3<n<m<k and n, m and k are integers, the lands having one of a shortest non-pit length (*3T), a longest non-pit length (*kT) and a non-pit length between the shortest non-pit length (*3T) and the longest non-pit length (*kT); and a test pattern area provided outside the data recording area and recorded with a test pattern having a pattern of pits with a pit length 3T, lands with a land length *mT, pits with a pit length nT, lands with a land length of *3T, bits with a pit length mT and lands with a land length *nT repeated.

According to another second aspect of the invention, there is provided an optical disk retrieving apparatus comprising: reading means for optically reading a test pattern and data as reproduction signals from an optical disk including a data recording area having pits and non-pits arranged in accordance with record data, and the test pattern having the pits and non-pits arranged based on a predetermined arrangement rule; detection means for detecting an error rate of a reproduction signal read from the test pattern; and compensation means for compensating a reproduction signal so as to minimize the error rate.

According to another third aspect of the invention, there is provided an optical disk playing method comprising the steps of: optically reading a test pattern and data as reproduction signals from an optical disk including a data recording area having pits and non-pits arranged in accordance with record data, and the test pattern having the pits and non-pits arranged based on a predetermined arrangement rule; detecting an error rate of a reproduction signal read from the test pattern; and compensating a reproduction signal so as to minimize the error rate.

According to another fourth aspect of the invention, there is provided a recording method of recording data on an optical disk comprising: a data conversion step of converting data to be recorded to pit data equivalent to a pattern of pits and lands, the pits having one of a shortest pit length (3T), a longest pit length (kT) and a pit length between the shortest pit length (3T) and the longest pit length (kT) where T is a channel pit length, 3<n<m<k and n, m and k are integers, the lands having one of a shortest non-pit length (*3T), a longest non-pit length (*kT) and a non-pit length between the shortest non-pit length (*3T) and the longest non-pit length (*kT); a step of preparing a test signal equivalent to a test pattern provided outside the data recording area and having a pattern of pits with a pit length having one of 3T, mT, nT, lands with a land length having another one of 3T, mT, nT, pits with a pit length having remaining one of 3T, mT, nT, lands with a land length having one of 3T, mT, nT, bits with a pit length having another one of 3T, mT, nT and lands with a land length having remaining one of 3T, mT, nT repeated; and a step of recording the pit data in a data recording area on the optical disk and the test signal in a test pattern area different from the data recording area on the optical disk, both in a pattern of the pits and non-pits.

According to another fifth aspect of the invention, there is provided a recording apparatus for recording data on an optical disk comprising: data conversion means for converting data to be recorded to pit data equivalent to a pattern of pits and lands, the pits having one of a shortest pit length (3T), a longest pit length (kT) and a pit length between the shortest pit length (3T) and the longest pit length (kT) where T is a channel pit length, 3<n<m<k and n, m and k are integers, the lands having one of a shortest non-pit length (*3T), a longest non-pit length (*kT) and a non-pit length between the shortest non-pit length (*3T) and the longest non-pit length (*kT); means for preparing a test signal equivalent to a test pattern provided outside the data recording area and having a pattern of pits with a pit length having one of 3T, mT, nT, lands with a land length having another one of 3T, mT, nT, pits with a pit length having remaining one of 3T, mT, nT, lands with a land length having one of 3T, mT, nT, bits with a pit length having another one of 3T, mT, nT and lands with a land length having remaining one of 3T, mT, nT repeated; and recording means for recording the pit data in a data recording area on the optical disk and the test signal in a test pattern area different from the data recording area on the optical disk, both in a pattern of the pits and non-pits.

BRIEF DESCRIPTION OF THE DRAWINGS

FIG. 1 is a block diagram schematically showing an optical disk apparatus according to the first embodiment of this invention;

FIG. 3 is a perspective view schematically depicting the structure of an optical disk shown in FIG. 1;

FIG. 4 is a plan view of an optical disk shown in FIGS. 1 and 3;

FIG. 5A is a plan view showing a row of longest pits as a test pattern to be formed on the optical disk shown in FIG. 4;

FIG. 5B is a waveform diagram illustrating the waveform of a reproduction signal reproduced from the longest pit row shown in FIG. 5A;

FIG. 6A is a plan view showing a row of shortest pits as a test pattern to be formed on the optical disk shown in FIG. 4;

FIG. 6B is a waveform diagram illustrating the waveform of a reproduction signal reproduced from this shortest pit row;

FIG. 13A presents a graph showing the frequency characteristic of a reproduction signal containing a tilt component;

FIG. 13B presents a graph showing the frequency characteristic of a transversal filter;

FIG. 13C presents a graph showing a combined frequency characteristic acquired by combining the frequency characteristic of a reproduction signal containing a tilt component and the frequency characteristic of a transversal filter;

FIG. 19 is a flowchart illustrating the encoding process in the encoder system shown in FIG. 18;

FIG. 20 is a flowchart illustrating how to prepare a file of picture data by combining main picture data, audio data and sub-picture data encoded by the flow shown in FIG. 15;

FIG. 26 is a graph showing the frequency characteristic of a reproducing system with respect to a pit row associated with the test pattern of a third group; and FIG. 27 is a graph for explaining the crosstalk characteristic.

DETAILED DESCRIPTION OF THE PREFERRED EMBODIMENTS

Optical disks and optical disk retrieving apparatuses according to preferred embodiments of the present invention will now be described with reference to the accompanying drawings.

Figure 2:
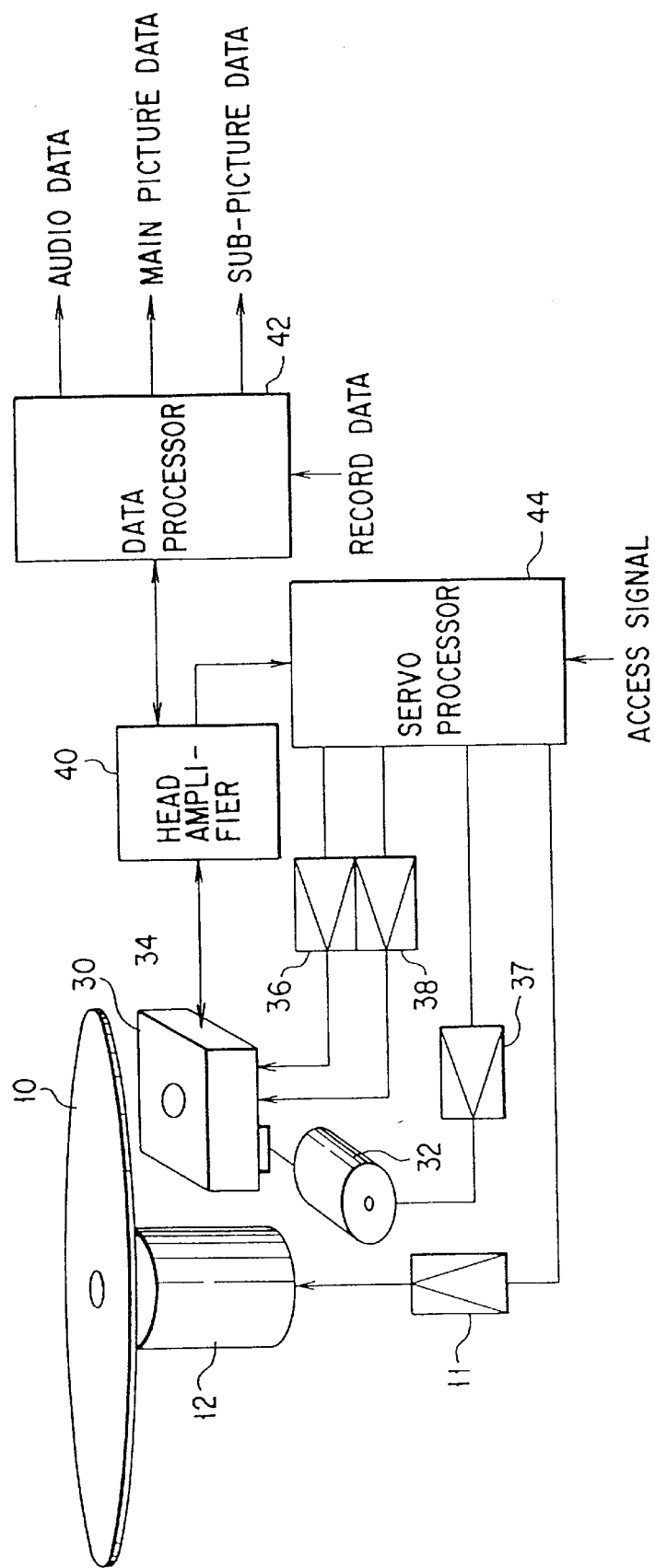
FIG. 2 is a block diagram showing the details of a disk drive apparatus shown in FIG. 1.

FIG. 1 presents a block diagram of an optical disk retrieving apparatus according to the first embodiment of this invention which reproduces data from an optical disk, FIG. 2 presents a block diagram of a disk drive section shown in FIG. 1 which drives the optical disk shown in FIG. 1, and FIGS. 3 and 4 illustrate the structure of the optical disk shown in FIGS. 1 and 2.

As shown in FIG. 1, the optical disk retrieving apparatus comprises a key operation/display section 4, a monitor section 6 and a speaker section 8. As a user manipulates the key operation/display section 4, recorded data is reproduced from an optical disk 10. The recorded data includes picture data, sub-picture data and audio data, which are converted to a video signal and an audio signal. The monitor section 6 displays a picture based on the audio signal, and the speaker section 8 generates sounds based on the audio signal.

As is know, the optical disk 10 can have various structures. This optical disk 10 may be a read only disk on which data is recorded at a high density as shown in FIG. 3. As shown in FIG. 3, the optical disk 10 comprises a pair of composite layers 18 and an adhesion layer 20 intervened between those composite disk layers 18. Each composite disk layer 18 has a transparent substrate 14 and a recording layer or a light reflection layer 20. The light reflection layer 16 in the disk layer 18 is so arranged as to contact the adhesion layer 20. This optical disk 10 has a center hole 22 with clamping areas 24 provided on both sides of the optical disk 10 and around the center hole 22 for clamping the optical disk 10 when it rotates. When the optical disk 10 is loaded into the optical disk apparatus, the spindle of a spindle motor 12 shown in FIG. 2 is inserted into the center hole 22, and the optical disk 10 is clamped by the clamping areas 24 while the disk 10 rotates.

As shown in FIG. 3, the optical disk 10 has information recording areas 25 around the clamping areas 24 on both sides of the optical disk 10, where information can be recorded. Each information recording area 25 has its outer peripheral area defined as a lead-out area 26 where no information is normally recorded, an inner peripheral area defined as a lead-in area 27 which adjoins to the associated clamping area 24 and where no information is normally recorded, and a data recording area 28 defined between the lead-out area 26 and the lead-in area 27. The data recording area 28 has a predetermined logic format which is specified as the specific standards to this optical disk. Please refer to the specification in U.S. patent Ser. No. Toshiba reference No. 3ZG19022-USA-A, Toshiba reference No. and our reference No. 95S0603 filed Jan. 30, 1996 by Kikuchi et al. (corresponding EPC Application No. 96101282.0) for the details of the logic format.

Tracks are continuously formed in a spiral form on the recording layer 16 of the information recording area 25 as an area where data is to be recorded. The continuous tracks are separated into a plurality of physical sectors which are given sequential numbers. Data is recorded sector by sector. The data recording area 28 of the information recording area 25 is the actual data recording area where reproduction information, video data, sub-picture data and audio data are recorded as pits (i.e., physical changes) are recorded as will be discussed later. For the read only optical disk 10, rows of pits are previously formed on the transparent substrate 14 by a stamper, a reflection layer is vapor-deposited on the pits-formed transparent substrate 14, and this reflection layer is formed as the recording layer 16. In the read only optical disk 10, normally, grooves as tracks are not provided but pit rows formed on the transparent substrate 14 are specified as tracks.

As shown in FIG. 4, as one example of a test pattern for evaluating rows of pits formed on the optical disk 10, the following four groups of pit rows are formed in both of or at least one of an area 29B outside the lead-out area 26 and contacting the area 26 and an area 29A outside the lead-in area 27 and contacting the area 27. The test pattern of the four groups is recorded in the inner area 29A outside the lead-in area 27 and contacting the area 27 when being recorded as evaluation data by an external signal generator, as separate from data to be reproduced like video data, as will be explained later. When evaluation data is provided at the head of data to be reproduced like video data so that the reproduction data is recorded following the evaluation data, however, the test pattern may be recorded in the lead-in area 27. As will be discussed later with reference to FIGS. 14A, 14B and 15 as another embodiment, evaluation data of a 3T-6T-7T pattern is recorded in the lead-in area 27.

In the following description of a pit row equivalent to the test pattern of the four groups, "T" represents the channel bit length, n and m are integers "(□T)" represents a pit length and "(*□T)" represents a non-pit length equivalent to the interval between adjoining pits. According to the optical disk retrieving apparatus shown in FIGS. 1 and 2, because the optical disk 10 is a CLV (Constant Linear Velocity) type whose rotational speed is changed in accordance with the radial position and whose tracks are scanned at a constant linear velocity by a light beam, pit lengths nT and mT are formed with given lengths over the inner track to the outer track of the optical disk 10.

(a) First group of a pit row (nT+*nT) of the longest pit length having pits and non-pits with the longest pit length (nT) repeated as shown in FIG. 5A.

(b) Second group of a pit row (mT+*mT) of the shortest pit length having pits and non-pits with the shortest pit length (mT) repeated as shown in FIG. 6A.

(c) Third group of a repeated pit row having a repeated pattern of pits and non-pits which have the following pit lengths equivalent to those between the shortest pit length row [(m+8)T+*(m+8)T] and a predetermined pit length row (8mT+*8mT) and which have no multiplication relation with one another between the shortest pit length row (mT+*mT) and the predetermined pit length row:

[(mT+*mT)] [repeated p times]
[(m+1)T+*(m+1)T)] [repeated q times]
[(m+2)T+*(m+2)T)] [repeated r times]
[(m+4)T+*(m+4)T)] [repeated s times]
[(m+8)T+*(m+8)T)] [repeated t times]

where p>q>r>s>t is satisfied and times needed to reproduce pit rows repeated p, q, r, s and t times are so selected to become approximately constant. Specifically speaking, [(m+8)T+*(m+8)T)] is equivalent to the longest pit length row (nT+*nT).

Figure 8:
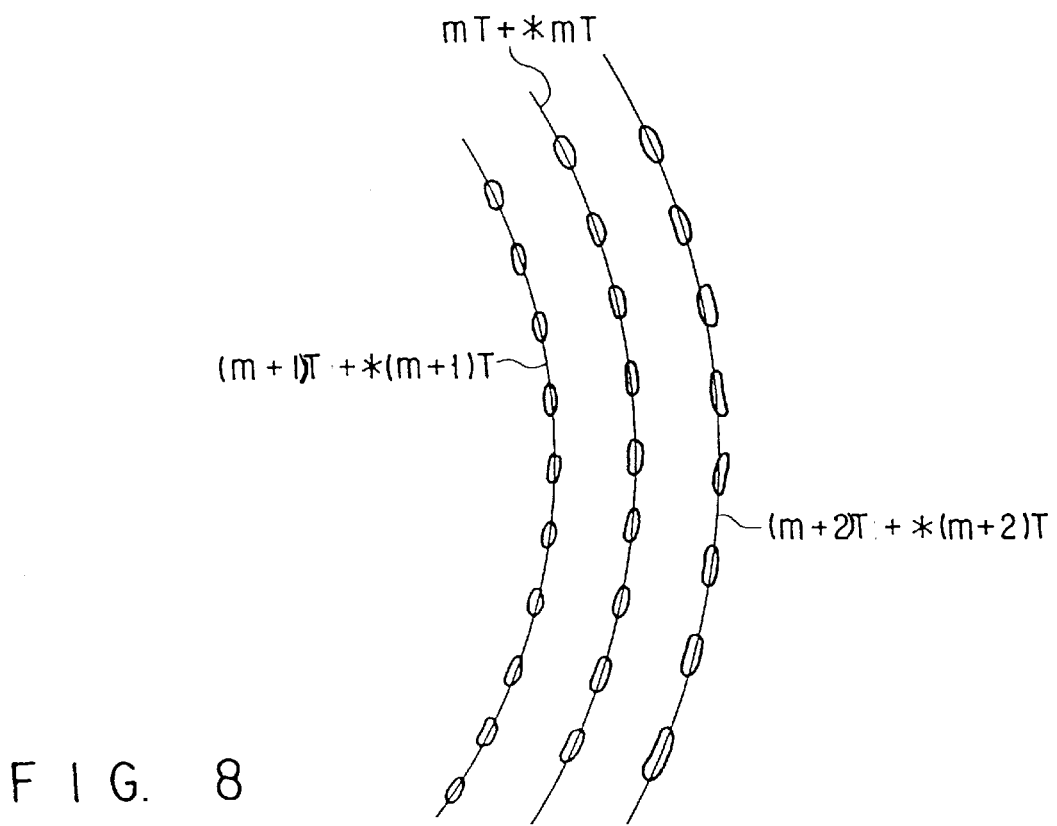
FIG. 8 is a plan view depicting a center pit row as a test pattern and adjoining pit rows.

(d) Fourth group of a pit length row, as shown in FIG. 8, in which the shortest pit length row (mT+*mT) is repeated over one track on the optical disk 10, the pit length row [(m+1)T+*(m+1)T)] as a track adjoining to the shortest pit length row (mT+*mT) corresponding to the center track is repeated over the innermost track in the diagram on the optical disk 10, and the pit length row [(m+2)T+*(m+2)T)] is repeated over the next track on the optical disk 10, adjacent to the shortest pit length row (mT+*mT) corresponding to the center track. In the forth group, as shown in FIG. 8, the pit length row [(m+1)T+*(m+1)T] as the inner track, the pit length row (mT+*mT) as the center track, and the pit long row [(m+2)+*(m+2)T] as the outer track are arranged along the radial direction of the optical disk 10. However, the pit length row [(m+2)T+*(m+2)T] as the inner track, the pit length row (mT+*mT) as the center track, the pit length row [(m+1)T+*(m+1)T] as the outer track may be arranged along the radial direction of the optical disk 10 in stead of the arrangement shown in FIG. 8.

More specifically, the pit length rows of the first group to the fourth group have the following relationship with (m=3) and (n=11).

(a) First group: a pit row (11T+*11T) having pits and non-pits with the longest pit length (3T) repeated.

(b) Second group: a pit row (3T+*3T) having pits and non-pits with the shortest pit length (3T) repeated.

(c) Third group: a repeated pattern of the following pit length rows.

(3T+*3T) [repeated p times]
(4T+*4T) [repeated q times]
(6T+*6T) [repeated r times]
(7T+*7T) [repeated s times]
(11T+*11T) [repeated t times]

As mentioned above, pit rows of (4T+*4T), (6T+*6T) and (7T+*7T) are equivalent to pit rows between the shortest pit length row (3T+*3T) and a predetermined pit length (11T+*11T), and they do not have a multiplication relation with each other.

(d) Fourth group: a pit length row in which the shortest pit length row (4T+*4T) is repeated over one track on the optical disk 10, the pit length row (5T+*5T) as a track adjoining to the shortest pit length row (4T+*4T) corresponding to the center track is repeated over the innermost track in the diagram on the optical disk 10, and the pit length row (6T+*6T) is repeated over the next track on the optical disk 10, adjacent to the shortest pit length row (4T+*4T) corresponding to the center track.

As another example of the test pattern, the following pit rows may be formed.

(a) First group of a pit row (nT+*nT) of the longest pit length having pits and non-pits with the longest pit length (nT) repeated as shown in FIG. 5A.

(b) Second group of a pit row (mT+*mT) of the shortest pit length having pits and non-pits with the shortest pit length (mT) repeated as shown in FIG. 6A.

As another example, the pit rows may have the following relationships.

(c) Third group of a repeated pit row having a repeated pattern having the following pit lengths equivalent to those between the shortest pit length row (mT+*mT) and a predetermined pit length row [(m+14)T+*(m+14)T] and which have no multiplication relation with one another between the shortest pit length row (mT+*mT) and the predetermined pit length row:

[(mT+*mT)] [repeated p times]
[(m+1)T+*(m+1)T)] [repeated q times]
[(m+3)T+*(m+3)T)] [repeated r times]
[(m+7)T+*(m+7)T)] [repeated s times]
[(m+14)T+*(m+14)T)] [repeated t times]

where p>q>r>s>t is satisfied and times needed to reproduce pit rows repeated p, q, r, s and t times are so selected to become approximately constant. Specifically speaking, [(m+14)T+*(m+14)T)] is equivalent to the longest pit length row (nT+*nT).

(d) Fourth group of a pit length row, as shown in FIG. 8, in which the shortest pit length row (mT+*mT) is repeated over one track on the optical disk 10, the pit length row [(m+1)T+*(m+1)T)] as a track adjoining to the shortest pit length row (mT+*mT) corresponding to the center track is repeated over the innermost track in the diagram on the optical disk 10, and the pit length row [(m+2)T+*(m+2)T)] is repeated over the next track on the optical disk 10, adjacent to the shortest pit length row (mT+*mT) corresponding to the center track.

More specifically, the pit length rows of the first group to the fourth group in the above example have the following relationship with (n=18) and (m=4).

(a) First group: a pit row (18T+*18T) having pits and non-pits with the longest pit length (18T) repeated.

(b) Second group: a pit row (4T+*4T) having pits and non-pits with the shortest pit length (4T) repeated.

(c) Third group: a repeated pattern of the following pit length rows.

(4T+*4T) [repeated p times]
(5T+*5T) [repeated q times]
(7T+*7T) [repeated r times]
(11T+*11T) [repeated s times]
(18T+*18T) [repeated t times]

Likewise, pit rows of (5T+*T), (7T+*7T) and (11T+*11T) are equivalent to pit rows between the shortest pit length row (4T+*4T) and a predetermined pit length (18T+*18T), and they do not have a multiplication relation with each other.

(d) Fourth group: a pit length row in which the shortest pit length row (4T+*4T) is repeated over one track on the optical disk 10, the pit length row (5T+*5T) as a track adjoining to the shortest pit length row (4T+*4T) corresponding to the center track is repeated over the innermost track in the diagram on the optical disk 10, and the pit length row (6T+*6T) is repeated over the next track on the optical disk 10, adjacent to the shortest pit length row (4T+*4T) corresponding to the center track.

Figure 7:
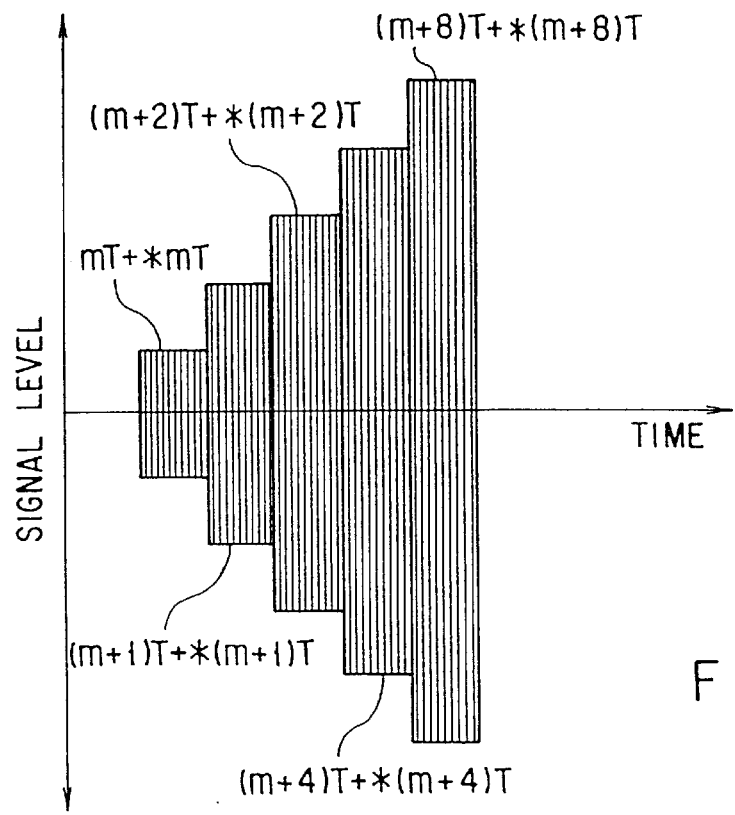
FIG. 7 is a graph showing MTF signals which are reproduced from the shortest pit row, the longest pit row and a pit row having different pit lengths lying between the shortest pit length and the longest pit length, as a test pattern.

As will be discussed later, the properness of pits formed on the optical disk which is prepared from a stamper or a master disk, is evaluated from the reproduced waveforms of the first and second groups as shown in FIGS. 5B and 6B. When the pit row of the third group is converted to a reproduction signal by a light beam, an MTF (Modulation Transfer Function) signal as shown in FIG. 7 is acquired. With regard to this MTF signal, the shorter the pit length is, the lower the amplitude of the reproduction signal becomes, and the longer the pit length is, the higher the amplitude of the reproduction signal becomes. The frequency characteristic of the reproduction signal reproduced from the pits can be evaluated from the characteristic of the MTF signal shown in FIG. 7.

As the pit row of the fourth group, as shown in FIG. 8, consists of the pit length row (mT+*mT) corresponding to the center track and the pit length rows [(m+1)T+*(m+1)T)] and [(m+2)T+*(m+2)T)] corresponding to the tracks adjoining to the center track, it is possible to evaluate the crosstalk from the adjoining tracks which is included in the reproduction signal. The amount of crosstalk Ct (=Br−At (dB)) is equivalent to the amplitude At of the reproducing track (corresponding to the center track) minus the amplitude Br of the adjoining track.

In addition to the pit rows of the first group to the fourth group formed in both of or at least one of the lead-out area 26 and the lead-in area 27, a second test pattern for compensating the relative tilt amount between the reproducing surface of the optical disk 10 and the surface of an objective lens 34 is formed as a pit row of the fifth group. In the pit row of the fifth group, a repeated pattern of the individual pit rows from the shortest pit length (mT+*mT) to the longest pit length (nT+*nT) arranged in the order of pit lengths.

Figure 9A:
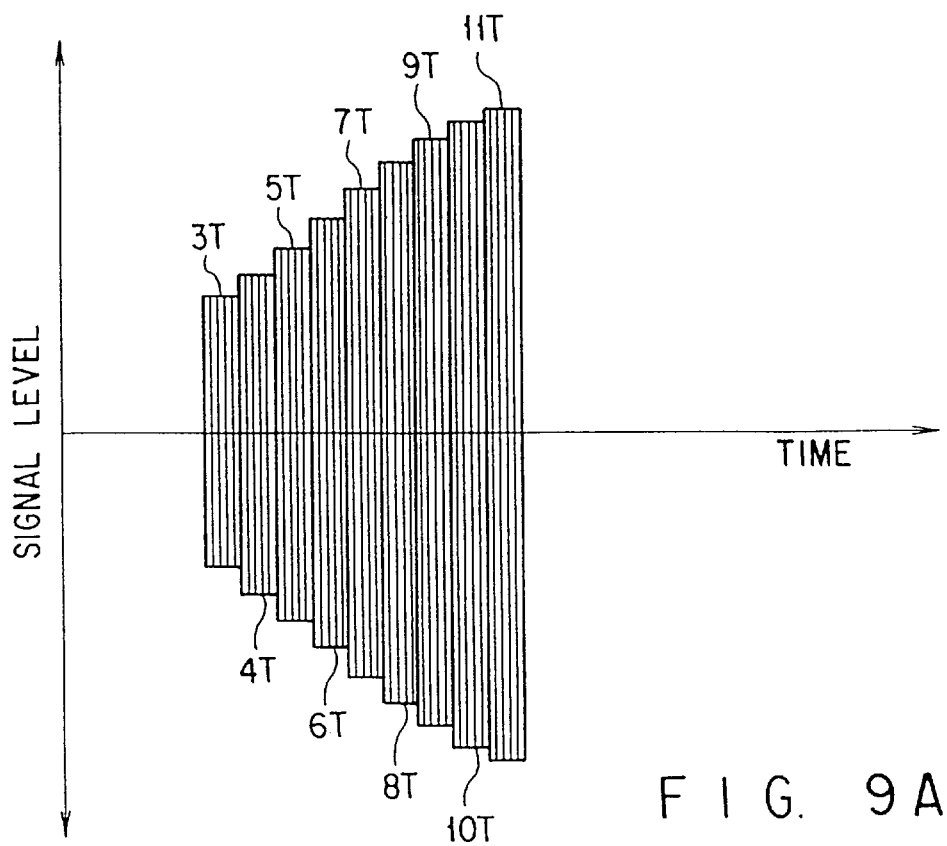
FIG. 9A is a graph showing MTF signals which are reproduced from the shortest pit row 3T, the longest pit row 11T and a pit row having different pit lengths 5T, 7T and 9T lying between the shortest pit length and the longest pit length, as a test pattern.
Figure 9B:
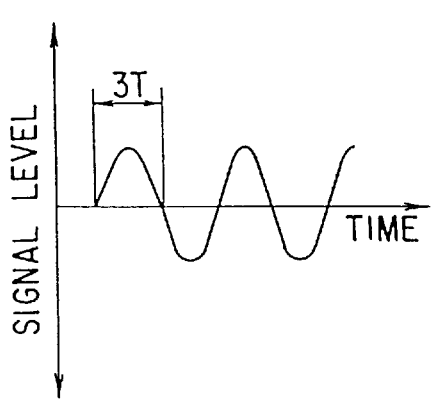
FIGS. 9B and 9C are waveform diagrams showing reproduced signals from the shortest pit row 3T and the longest pit row 11T as a test pattern.
Figure 9C:
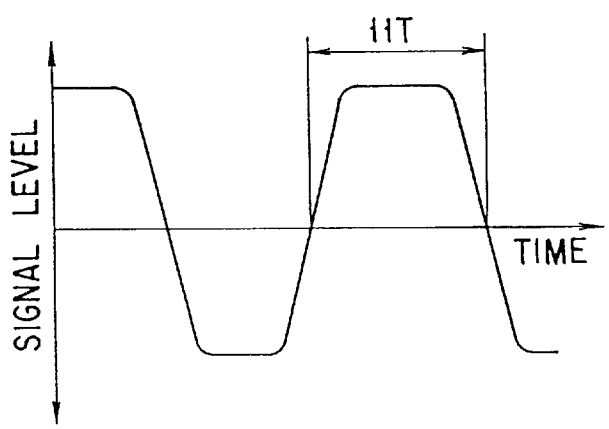

In the first example of the fifth group, m=3 and n=11, and a pit row having the pit lengths from 3T to 11T are arranged. As another example of the fifth group, m=4 and n=18, and a pit row having the pit lengths from 4T to 18T are arranged. In the first example of the fifth group, when the second test pattern is reproduced, an MTF signal as shown in FIGS. 9A, 9B and 9C is reproduced. m=3 and n=11, and a pit row having the pit lengths from 3T to 11T are arranged. As will be discussed in detail later, the relative tilt amount between the reproducing surface of the optical disk 10 and the surface of the objective lens 34 is compensated by this MTF signal. It is understood from FIG. 9A that the number of repeats of each pit row is so set as that the time for reproducing that repeated pit row becomes approximately constant as in the case of the repeating numbers of the third group (from p to t). The MTF signal shown in FIG. 9A is a set of the signal waveforms corresponding to the individual pits as is apparent from the signal waveforms in FIGS. 9B and 9C which are the enlarged signal waveforms of the MTF signal.

Now, the optical disk retrieving apparatus for reproducing data from such an optical disk 10 will be discussed with reference to FIGS. 1 and 2. The optical disk retrieving apparatus causes a disk drive section 30 to scan the optical disk 10 with a light beam. More specifically, as shown in FIG. 2, the optical disk 10 is placed on the spindle motor 12 which is driven by a motor driver 11, and is rotated at a constant linear velocity by this spindle motor 12. Located below the optical disk 10 is an optical head or optical pickup 32 which focuses a light beam or laser beam on the optical disk 10. This optical head 32 is mounted on a guide mechanism (not shown) which is movable in the radial direction of the optical disk 10 to seek particularly the data recording area 28. The optical head 32 is moved in the radial direction of the optical disk 10 by a feed motor 33 which is driven by a drive signal from a driver 37. The objective lens 34 is supported movable along its optical axis with respect to the optical disk 10. In response to a drive signal from a focus driver 36, the objective lens 34 is moved along the optical axis to be always kept on-focus to form a minute beam spot on the recording layer 16. This objective lens 34 is supported so as to be slightly movable in the radial direction of the optical disk 10. In response to a drive signal from a track driver 38, therefore, the objective lens 34 is slightly shifted to be always kept in a tracking state so that tracks on the recording layer 16 are tracked with the light beam.

The optical head 32 detects the light beam reflected from the optical disk 10, and supplies the detection signal to a servo processor 44 via a head amplifier 40. The servo processor 44 produces a focus signal, a tracking signal and a motor control signal from the detection signal, and supplies those signals to the respective drivers 36, 38 and 11. As a result, the objective lens 34 is kept in the on-focus state and the tracking state, the spindle motor 12 is rotated at a predetermined speed, and the tracks on the recording layer are tracked with a light beam at, for example, a constant linear velocity. When a control signal as an access signal is supplied to the servo processor 44 from a system CPU section 50, the servo processor 44 sends a move signal to the driver 37. Consequently, the optical head 32 is moved in the radial direction of the optical disk 10, and a predetermined sector on the recording layer 16 is accessed so that reproduced data is output from the disk drive section 30 after being amplified by the head amplifier 40. The output reproduced data is stored in a data RAM section 56 via the system CPU section 50 and a system processor section 54, which are controlled by a program recorded in a system ROM and RAM section 52. The stored reproduced data is processed by the system processor section 54 to be classified into video data, audio data and sub-picture data, which are respectively sent to a video decoder section 58, an audio decoder section 60 and a sub-picture decoder section 62 to be decoded. A D/A and reproduction processor 64 converts the decoded video data, audio data and sub-picture data to an analog video signal, an analog audio signal and an analog sub-picture signal, and performs signal mixing so that the video signal and sub-picture signal are supplied to the monitor section 6 and the audio signal is supplied to the speaker section 8. As a result, a picture is displayed on the monitor section 6 and sounds are produced from the speaker section 8.

As described above, when the reproduction operation of the optical disk retrieving apparatus shown in FIGS. 1 and 2 starts, both of or at least one of the inner area 29A outside the lead-in area 27 and contacting the area 27 and the outer area 29B outside the lead-out area 26 and contacting the area 26 is searched for the pit row of the fifth group equivalent to the second test pattern for detecting the tilt amount, and the reproduction signal of the pit row is read into a data processor 42 in FIG. 2. Based on the detected tilt amount, the tilt component included in the reproduction signal at the time of searching the data area 25 is substantially removed in the following manner.

Figure 10:
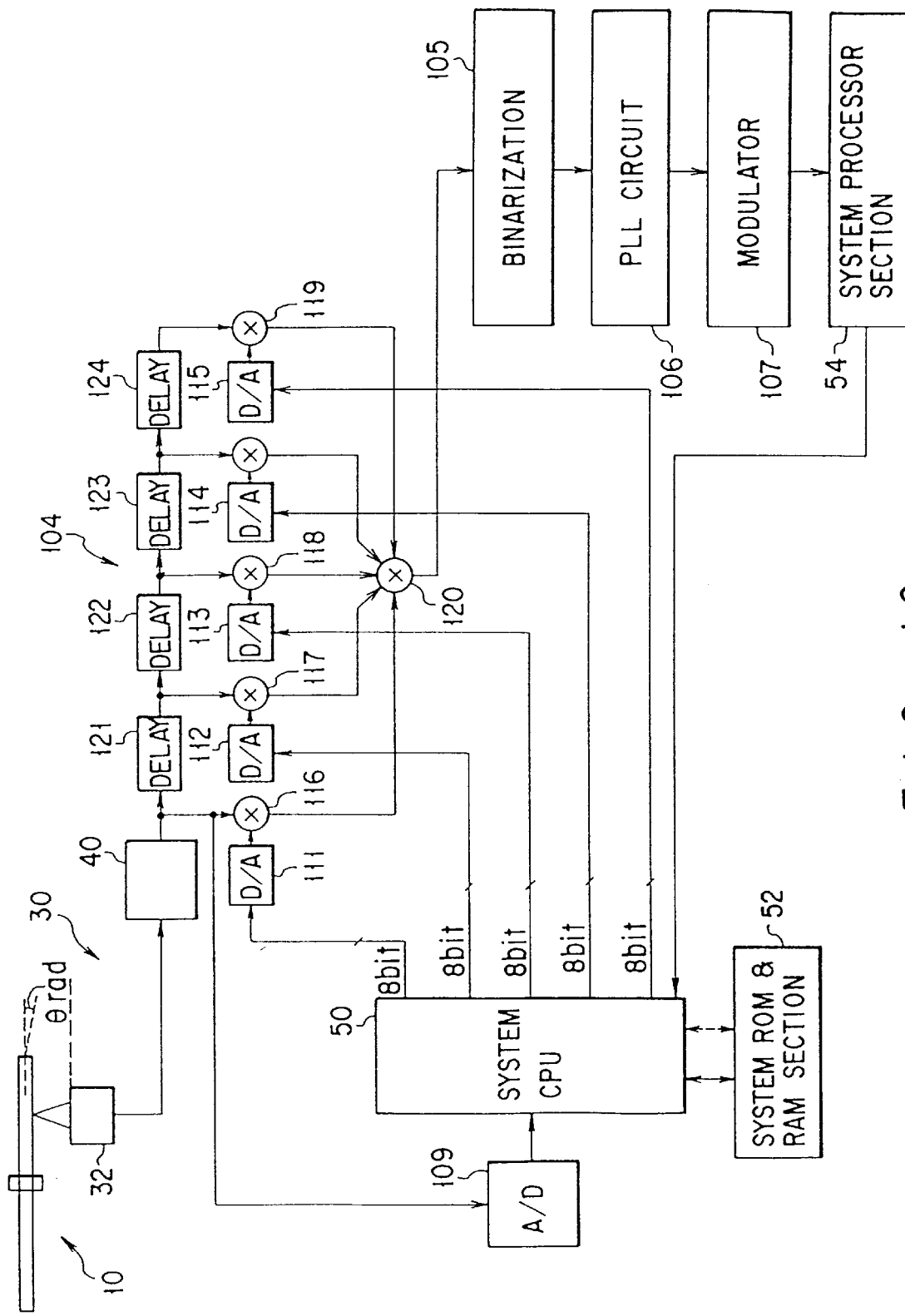
FIG. 10 is a block diagram illustrating a tilt compensation circuit, which is incorporated in the optical disk apparatus shown in FIG. 1 and compensates a reproduction signal using a test signal.

A tilt compensation circuit incorporated in the data processor 42 is illustrated in FIG. 10. As already described earlier, information recorded on the optical disk 10 is picked up by the optical head 32 and the analog reproduction signal is sent to the head amplifier 40. After being amplified by the head amplifier 40, this analog reproduction signal is supplied to a 5-tap transversal filter 104 comprising delay circuits 121 to 124 to compensate its signal waveform as will be described later. The resultant signal is supplied to a binarization circuit 105. The binarization circuit 105 binarizes the reproduction signal reproduction signal, and the resultant digital reproduction signal is sent to a PLL circuit 106 to be reproduced in response to a clock. The resultant signal is then demodulated by a demodulator 107 after which the demodulated signal is sent to the system processor 54.

Figure 11:
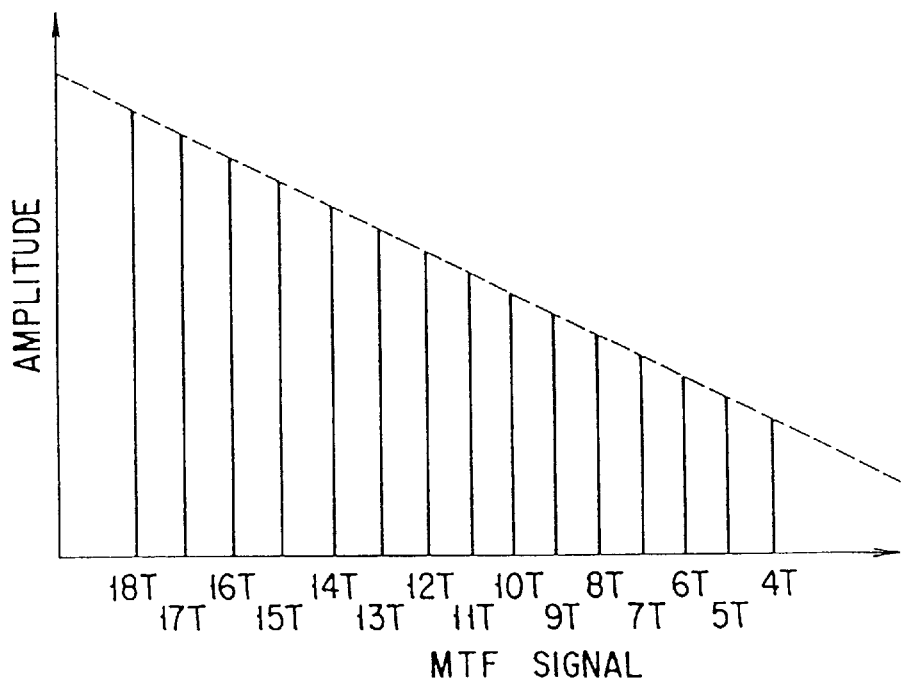
FIG. 11 is a graph showing the frequency characteristic of an idealistic reproduction signal with respect to the test pattern.

While, as has already been explained above, pit rows as the second test pattern belonging to the fifth group are formed on the optical disk 10 as shown in FIG. 4, the pit rows belonging to the fifth group are detected first at the time of reproduction. The following will explain the pit rows 4T to 18T as one example. When the pit rows 4T to 18T as the test pattern are reproduced, an MTF reproduction signal is reproduced and is subjected to A/D conversion by an A/D converter 109. From this digital MTF reproduction signal, the system CPU section 50 acquires a compensation coefficient which compensates the pit rows 4T to 18T associated with the second test pattern in such a way as to have the idealistic amplitude characteristic as shown in FIG. 11, and stores this compensation coefficient into the system ROM and RAM section 52.

Figure 12:
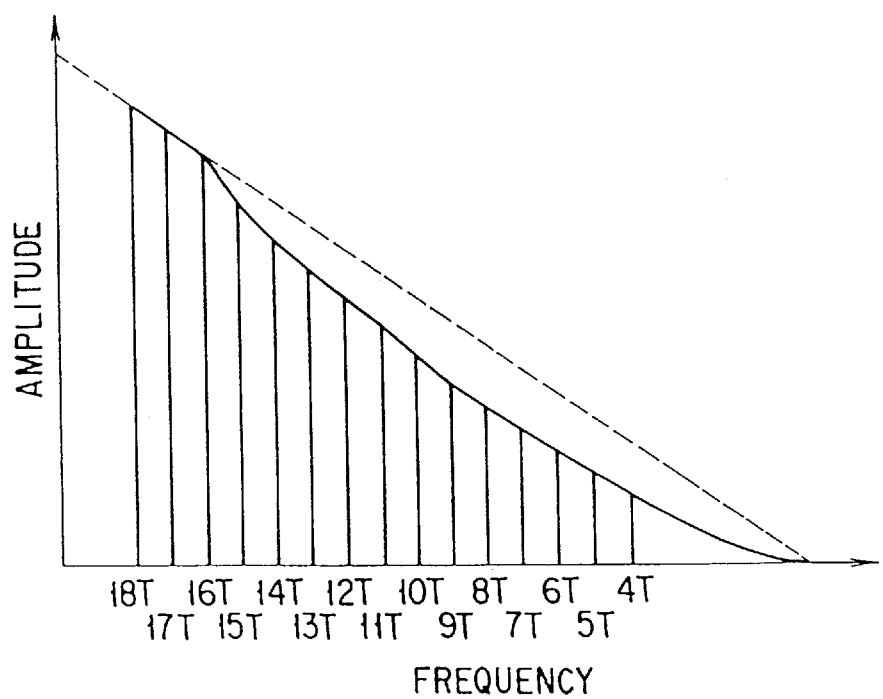
FIG. 12 is a graph showing the frequency characteristic of an actual reproduction signal containing a tilt component with respect to the test pattern.

Generally, when a relative inclination, e.g., a tilt angle $\theta$ rad occurs between the optical disk and the optical head 32 during the rotation of the optical disk 10, as shown in FIG. 10, the level of the reproduction signal is periodically attenuated as indicated by the solid line in FIG. 12. The reproduction signal from the pit rows to be compensated is multiplied by the compensation coefficient which compensates for the level attenuation, thereby yielding the idealistic signal waveform as indicated by the broken line in FIG. 12. More specifically, the system CPU section 50 compares the level or amplitude of the digital MTF reproduction signal of the second test pattern, which has partially been attenuated by the tilt, with an idealistic reference signal level with respect to each pit row to acquire the difference therebetween. When the actual signal level for each pit row matches the reference signal level, the compensation coefficient is set to "1." When there is a difference between those signal levels, the compensation coefficient which is to be multiplied with the actual signal level to set the latter signal level, to the reference level is determined. These compensation coefficients are obtained for the individual pit rows 4T to 18T, and are stored in the system ROM and RAM section 52 as tilt compensation coefficients specific to the optical disk 10 loaded in the retrieving apparatus or the frequency characteristics of the reproducing system.

The tilt compensation coefficient may be determined by the second test pattern associated with the pit row of the fifth group, which is formed in either the lead-in area 27 or the lead-out area 26. The tilt compensation coefficient may also be determined by the second test patterns recorded in both areas 26 and 27. As shown in FIG. 4, when a track on an inner area 72 with respect to the center, 70, of the data area 25 is searched, an inner-track tilt compensation coefficient may be used, while when a track on an outer area 74 with respect to the center 70 of the data area 25 is searched, an outer-track tilt compensation coefficient may be used. In this case, it is apparent that the inner-track tilt compensation coefficient is determined by the second test pattern associated with the pit row of the fifth group formed in the lead-in area 27 and the outer-track tilt compensation coefficient is determined by the second test pattern associated with the pit row of the fifth group formed in the lead-out area 26. As the area to be searched changes toward the outer track from the inner track, the tilt compensation coefficient increases. In this respect, a position compensation coefficient for the positional compensation of the tilt compensation coefficient may be determined in accordance with the area to be searched or the track number and may be stored in the system ROM and RAM section 52, so that the compensation coefficient according to the searching position may be output from the system CPU section 50.

In the circuit shown in FIG. 10, after the frequency characteristic of the reproducing system is grasped, data retrieval from the data area 25 starts. More specifically, to optimize the frequency characteristic of the reproduction signal from the data area 25 detected by the optical head 32, the system CPU section 50 sends the compensation coefficients as compensation data to the transversal filter 104. The transversal filter 104 converts the received data to analog data by D/A converters 111 to 115 and multiplies the analog data by individual tap outputs of the transversal filter 104 by multipliers 116 to 120. When a tilt amount is 5 mrad, for example, the reproduction signal of the second test pattern may have the frequency characteristic as shown in FIG. 13A. To compensate this frequency characteristic to be the optimal characteristic as shown in FIG. 13C, the compensation coefficient characteristic as shown in FIG. 13B should be output, so that the system CPU section 50, which determines the individual tap coefficient values of the transversal filter 104, outputs coefficient values, for example, 10H, 20H, FFH, 20H and 10H to the respective D/A converters 111, 112, 113, 114 and 115. Even if the optical disk 10 tilts and the frequency characteristic of the reproduction signal is impaired, the reproduction signal can be compensated by the frequency characteristic of the transversal filter 104, thus ensuring the proper reproduction operation.

Referring to FIGS. 13A, 13B and 13C, $\lambda$ indicates the wavelength of a light beam or laser beam, and NA the number of apertures of the objective lens 32.

Figure 14A:
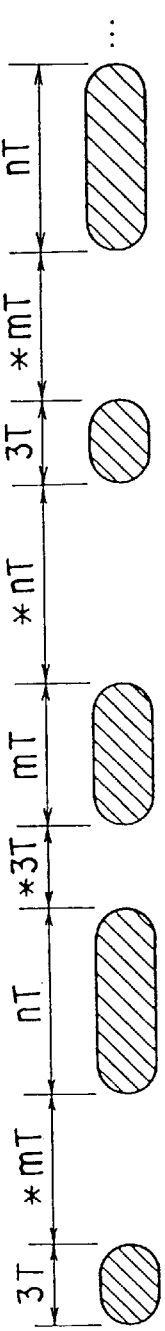
FIG. 14A is a plan view depicting a row of pits showing an evaluation pattern according to another embodiment of this invention.
Figure 14B:
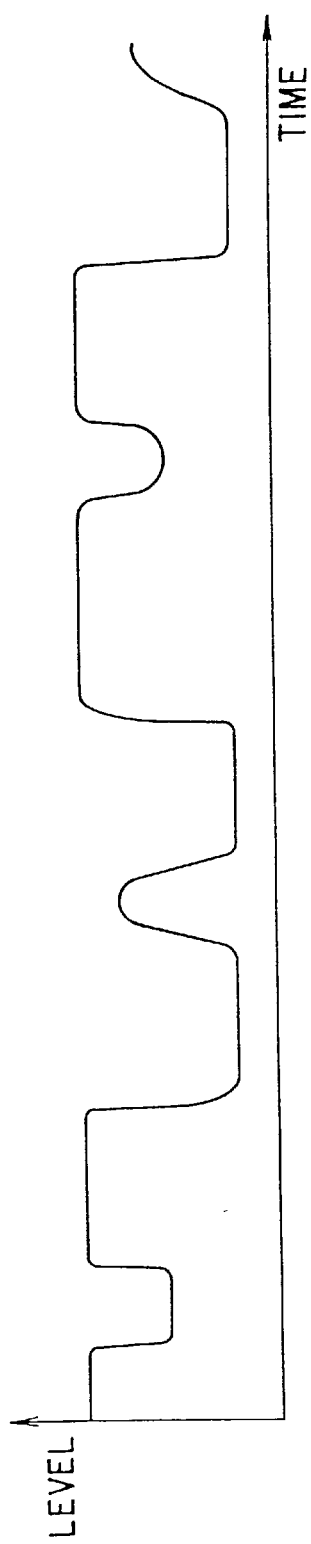
FIG. 14B is a waveform diagram showing a reproduction signal from the pit row shown in FIG. 14A.
Figure 15:
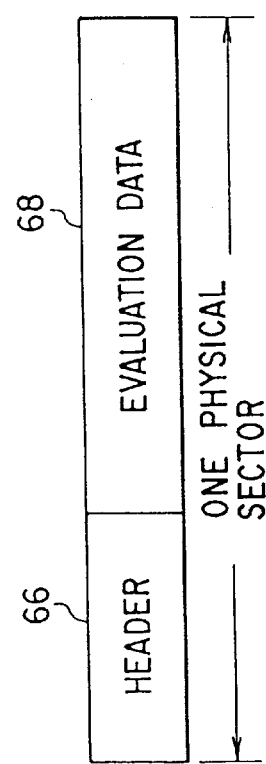
FIG. 15 is a schematic diagram showing the structure of data of an evaluation pattern shown in FIG. 14A.

An evaluation pattern associated with another embodiment of this invention will now be described with reference to FIGS. 14A, 14B and 15. As another example of the test pattern for evaluating pit rows formed on the optical disk 10, pits and lands with the repetition cycles of 3T, mT and nT as shown in FIG. 14A are recorded as evaluation data in the lead-in area 27 shown in FIG. 4, which is to be retrieved first at the time of playing the optical disk 10. That is, a pit with the pit length 3T, a land with the land length *mT, a pit with the pit length nT, a land with the land length *3T, a pit with the pit length mT, and a land with the land length *nT are recorded as repeated evaluation data 68 in one physical sector in the lead-in area 27 following a header 66 where the physical sector address is described as shown in FIG. 15. One physical sector including this evaluation data may be provided at least one location or at several locations on a given track. Alternatively, a plurality of physical sectors including the evaluation data may be provided on different tracks. In this example, m and n$\geq$6, and m and n$\leq$14 (=k). The pit or land length 3T or *3T is equivalent to the shortest pit length or the shortest land length, and the pit or land length 14T or *14T (kT, *kT) is equivalent to the longest pit length or the longest land length. When the evaluation data shown in FIG. 14A is retrieved with a light beam, the level of the reflected light beam as shown in FIG. 14B is detected.

One specific example of the evaluation data has m=6 and n=7, and a pit with the pit length 3T, a land with the land length *6T, a pit with the pit length 7T, a land with the land length *3T, a pit with the pit length 6T, and a land with the land length *7T are repeatedly recorded as evaluation data. This set of 3-6-7 pit lengths and land lengths is equivalent to "0010000010000001" as a code word in a hexadecimal notation. This 16-bit code word is equivalent to an 8-bit data symbol 172H. This 16-bit code word is converted to the 8-bit data symbol 172H by 8/16 conversion.

Figure 16:
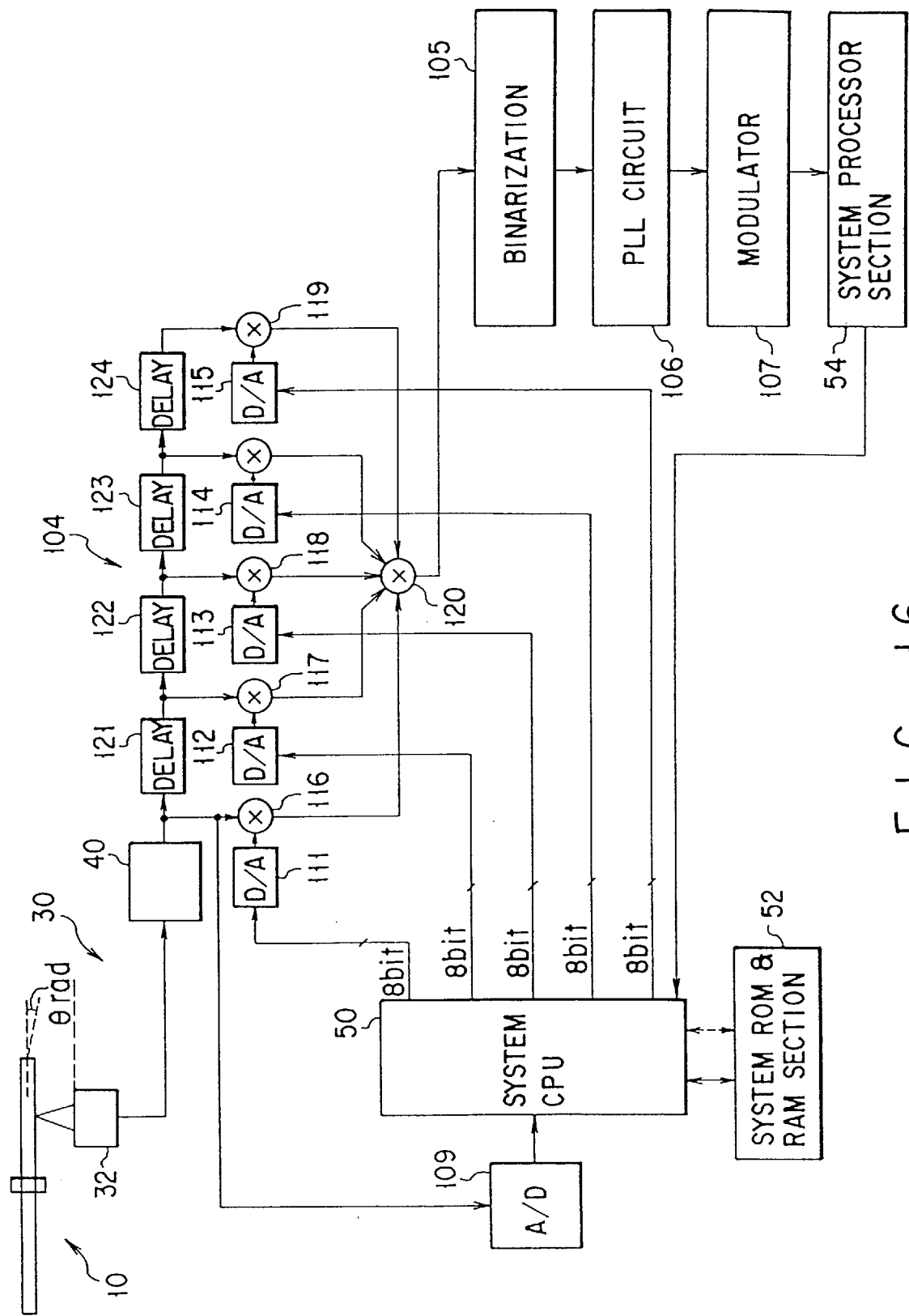
FIG. 16 is a block diagram illustrating a tilt compensation circuit, which is incorporated in the optical disk apparatus shown in FIG. 1 and compensates a reproduction signal using an evaluation pattern.

The evaluation data shown in FIG. 14A is detected by an error rate compensation circuit shown in FIG. 16 whose circuit structure is substantially similar to the one shown in FIG. 10, and an error rate compensation coefficient is determined there to minimize the byte error rate. When the optical disk retrieving apparatus starts the reproduction operation as indicated by step S50 shown in FIG. 17, the lead-in area 27 on the optical disk 10 is searched as indicated in step S51, and a sector containing the evaluation data or test signal shown in FIG. 15 is retrieved as indicated in step S52. When the sector containing the test pattern is found, the system CPU section 50 sets the default tap coefficients in the multipliers 116 to 120 of the transversal filter 104 as an equalizer as described in step S53, reads the test pattern having the 3-6-7 pattern shown in FIG. 14A from the found sector and sends the test pattern to the head amplifier 40. This test pattern signal is amplified by the head amplifier 40, and is supplied to the binarization circuit 105 via the 5-tap transversal filter 104 which comprises the delay circuits 121 to 124. The binarization circuit 105 digitizes the reproduction signal after which the digital reproduction signal is subjected to clock reproduction in the PLL circuit 106. When there is no error, the demodulator 107 outputs "0010000010000001" as a code word in a hexadecimal notation. If there is a reading error, the demodulator 107 outputs another code word containing an error. This code word is supplied to the system processor 54 to be converted to a data symbol which is in turn sent to the system CPU section 50. The system CPU section 50 determines if the code word coincides with the data symbol 172H. Likewise, the 3-6-7 patterns are sequentially converted to code words to measure the byte error rate as described in step S54, and the system CPU section 50 checks if there is an error to compute the byte error rate for a predetermined number of 3-6-7 patterns. When the byte error rate is greater than $10^{-15}$, the system CPU section 50 returns to step S53 to set other tap coefficients in the multipliers 116 to 120 of the transversal filter 104 as the equalizer and re-executes steps S54 and S55. When the byte error rate falls within $10^{-5}$, the tap coefficients are fixed and the normal reproduction operation starts as indicated in step S56.

In the above described example of the other embodiment, the evaluation data has m=6 and n=7 and 3-6-7 pit and land length set. However, the evaluation data may have m=7 and n=6 and may have one of 3-7-6, 6-3-7, 7-3-6, 6-7-3 and 7-6-3 pit and land length sets. In the 3-7-6 pit and land length set, the evaluation data has a pit with the pit length 3T, a land with the land length *7T a pit with the pit length 6T, a land with the land length *3T, a pit with the pit length 7T and a land with the land length *6T as described in a same manner of 3-6-7 set. In the 6-3-7 pit and land length set, the evaluation data has a pit with the pit length 6T a land with the land length *3T, a pit with the pit length 7T, a land with the land length *6T a pit with pit length 3T, and a land with the land length *7T. In the other set, the evaluation data has a similar arrangement in an order of numerical arrangement.

Referring to FIGS. 18 through 24, a description will now be given of a method of recording evaluation data together with picture data and management data for reproducing the picture data on the optical disk, and a recording system to which this recording method is adapted.

Figure 18:
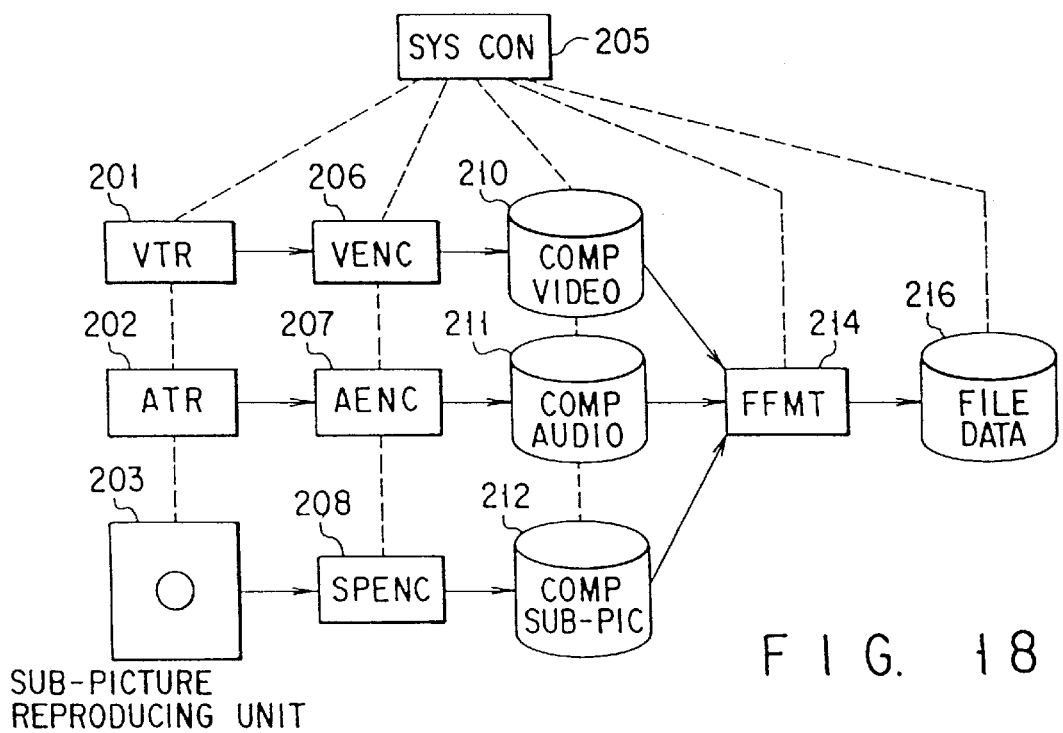
FIG. 18 is a block diagram of an encoder system for encoding picture data to produce a picture file.

FIG. 18 illustrates an encoder system which generates a picture file 88 of a title set 84 which has picture data encoded. The system shown in FIG. 20 employs, for example, a video tape recorder (VTR) 201, an audio tape recorder (ATR) 202 and a sub-picture reproducing unit 203 as the sources of main picture data, audio data and sub-picture data. Those components respectively generate main picture data, audio data and sub-picture data under the control of a system controller (Sys con) 205. Those data are supplied to a video encoder (VENC) 206, an audio encoder (AENC) 207 and a sub-picture encoder (SPENC) 208 which convert the received data and encode the data in the respective compression systems also under the control of the system controller 205. The encoded main picture data, audio data and sub-picture data (Comp Video, Comp Audio and Comp Sub-pict) are stored in memories 210, 211 and 212, respectively. At the time of the encoding, the data are compressed by the compression systems which are specified by, for example, MPEG2 (Moving Picture Expert Group 2), and packed video and audio data and sub-picture pack data are equivalent to the encoded data.

The main picture data, audio data and sub-picture data are sent by the system controller 205 to a file formatter (FFMT) 214 to be converted to have the file structure of picture data which will be used by the system, and management information such as the set conditions and attributes of the individual pieces of data are stored as a file into a memory 216 by the system controller 205.

The following will describe the standard flow for the encoding process by the system controller 205 to prepare a file from picture data.

In accordance with the flow illustrated in FIG. 19, main picture data and audio data are encoded to prepare encoded main picture data and audio data (Comp Video and Comp Audio). When the encoding process starts, parameters necessary for encoding the main picture data and audio data are set as described in step S70 in FIG. 19. Some of the set parameters are saved in the system controller 205 and are used by the file formatter 214. The main picture data is pre-encoded using the associated parameters to compute the distribution of the optimal code amount as shown in step S71. Based on the code amount distribution established by the pre-encoding, the main picture data is encoded as indicated in step S72. At this time, audio data is also encoded. If necessary, as indicated in step S73, the main picture data is partially encoded again and the portion corresponding to the re-encoded portion is replaced with the re-encoded portion of the main picture data. The above sequence of steps causes the main picture data and audio data to be encoded. Further, sub-picture data is encoded to prepare encoded sub-picture data (Comp Sub-pict) as described in steps S74 and S75. Likewise, parameters necessary for encoding the sub-picture data are set. As indicated in step S74, some of the set parameters are saved in the system controller 205 and are used by the file formatter 214. Based on the parameters, the sub-picture data is encoded. The sub-picture data is encoded in the above-described manner.

In accordance with the flow illustrated in FIG. 20, the encoded main picture data, audio data and sub-picture data (Comp Video, Comp Audio, Comp Sub-pict) are combined to be converted to have a specific data structure. More specifically, a data cell as the minimum unit of picture data having a plurality of video, audio and sub-picture packs is set and reproduction information for reproducing each data cell is prepared as indicated in step S76. Next, the structure of a cell which constitutes a program chain linking a plurality of programs allocated in the cell reproducing order, the main picture, sub-picture and audio attributes, etc. are set (information acquired at the time of encoding the individual data are used for some of the attribute information), and cell reproduction management information for managing the cell reproduction is prepared from the cell information. Each of the encoded main picture data, audio data and sub-picture data is segmented to packs of given sizes, individual data units are arranged while arranging a navigation pack for controlling the reproduction of the associated pack at the head of each predetermined data unit in such a way as to be reproducible in the order of the time codes of the individual data. A cell is structured of those data units. Thereafter, video objects each comprising a plurality of cells are constructed, and are formatted to the structure of a title set for reproducing the video of a given title corresponding to a set of the video objects.

Figure 21:
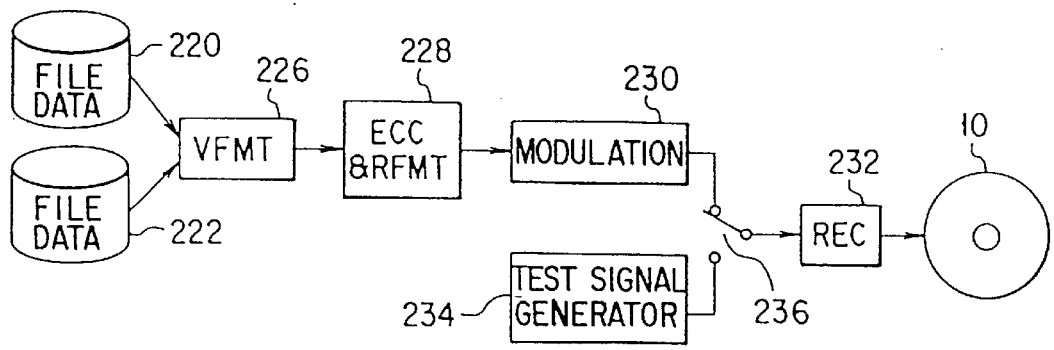
FIGS. 21 and 22 are block diagrams illustrating disk formatter systems for recording a formatted picture file on an optical disk.
Figure 22:
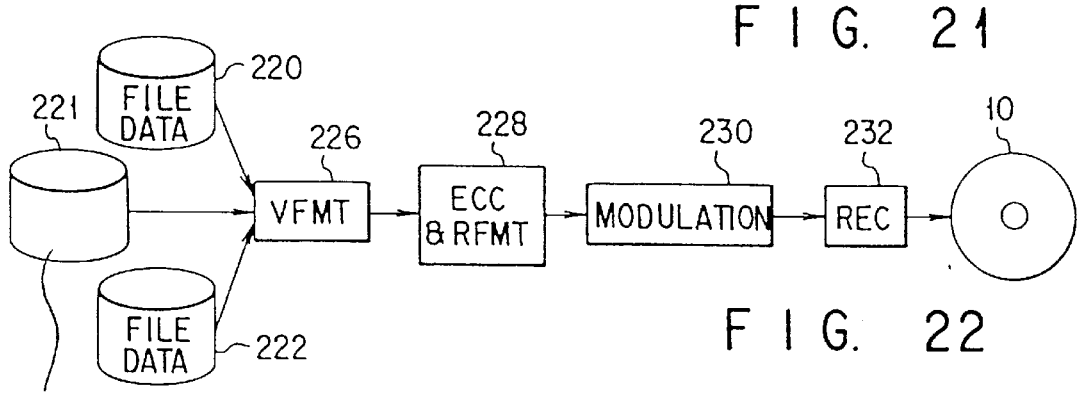

FIGS. 21 and 22 illustrates the systems of a disk formatter which records the title set, formatted in the above-described manner, on an optical disk. As shown in FIGS. 21 and 22, in the disk formatter systems, those file data are supplied to a volume formatter (VFMT) 226 from memories 220 and 222 where the prepared title sets are stored. The volume formatter 226 acquires management information from the manages title sets 84 and 86, prepares a video manager which manages the title sets, and prepares logic data in a state to be recorded on the disk in a predetermined arrangement order. A disk formatter (DFMT) 228 affixes error correction data to the logic data which has been prepared by the volume formatter 226, and the resultant data is reconverted to physical data to be recorded on the disk 10. A modulator 230 converts the physical data, prepared by the disk formatter 228, to record data which is to be actually recorded on the disk. This modulated record data is recorded on the disk 10 by a recorder 232.

With regard to the test pattern which has been described referring to FIGS. 5A to 9C, the recorder 232 in the formatter system shown in FIG. 21 is connected to a test pattern signal generator 234 via a switch 236. This test pattern signal generator 234 generates a test pattern signal associated with the first and second test patterns associated with the pit rows of the first to fifth groups which have been described earlier. In accordance with the generated test pattern signal, the test patterns of the first to fifth groups are recorded in and near the lead-in area 27. After the recording of the test patterns, the switch 236 is changed over to connect the recorder 232 to the modulator 230, allowing physical data to be recorded in the data area 28. When the recording of the physical data is completed, the switch 236 is switched again to connect the recorder 232 to the test pattern signal generator 234, so that the pit rows of the first to fifth groups are recorded again on the optical disk 10.

With regard to the 3-6-7 pattern which has been described referring to FIGS. 14A and 15, a memory 221 where evaluation data containing the consecutive 3-6-7 pattern is stored together with the sector address shown in FIG. 15 is prepared in advance as shown in FIG. 22, this evaluation data is supplied first to the volume formatter 226 after which file data are supplied to the volume formatter 226 from the file data memories 220 and 222. Therefore, the evaluation data having the consecutive 3-6-7 pattern is recorded together with the sector address at a predetermined sector address, and record data such as video data is recorded as physical data in the data area 28.

Figure 23:
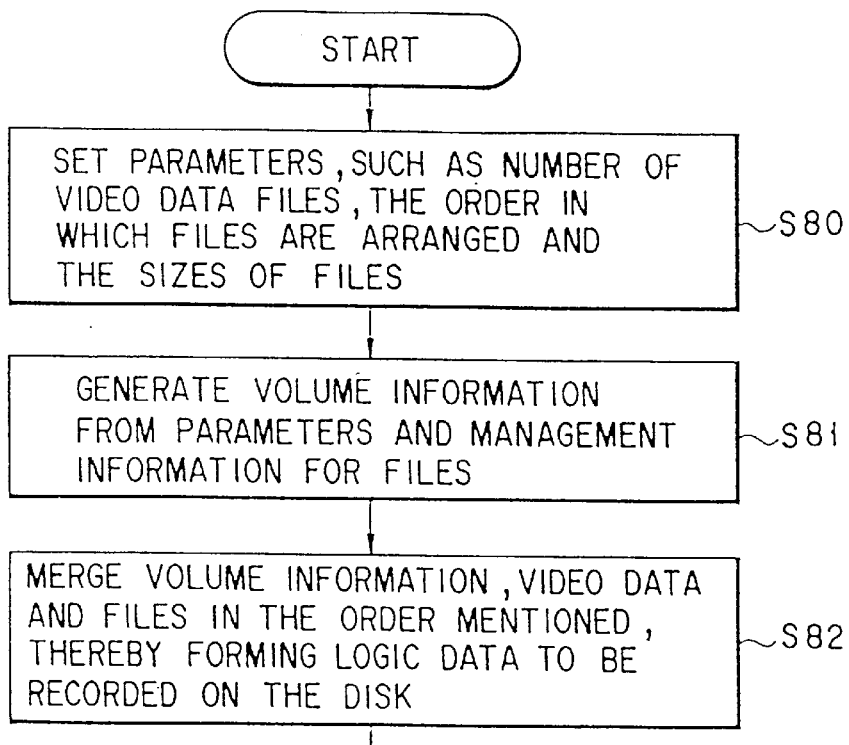
FIG. 23 is a flowchart illustrating how the disk formatters shown in FIGS. 21 and 22 prepare logic data to be recorded on a disk.

The standard flow for preparing the above-described disk will now be described with reference to FIGS. 23 and 24. FIG. 23 illustrates the flow for preparing logic data to be recorded on the disk 10. As indicated in step S80, parameter data such as the number of picture data files, the sort order and the size of each picture data file is set first. Then, a video manager 71 is prepared from the set parameters and video title set information from each video title set 72 as described in step S81. Then, data are arranged according to the associated logic block numbers in the order of the video manager 71 and then the video title set 72, thus yielding logic data to be recorded on the disk 10, as shown in step S82. As has already been explained, the 3-6-7 pattern is equivalent to logic data of 172H so that logic data 172H are converted to physical data consecutively.

Figure 24:
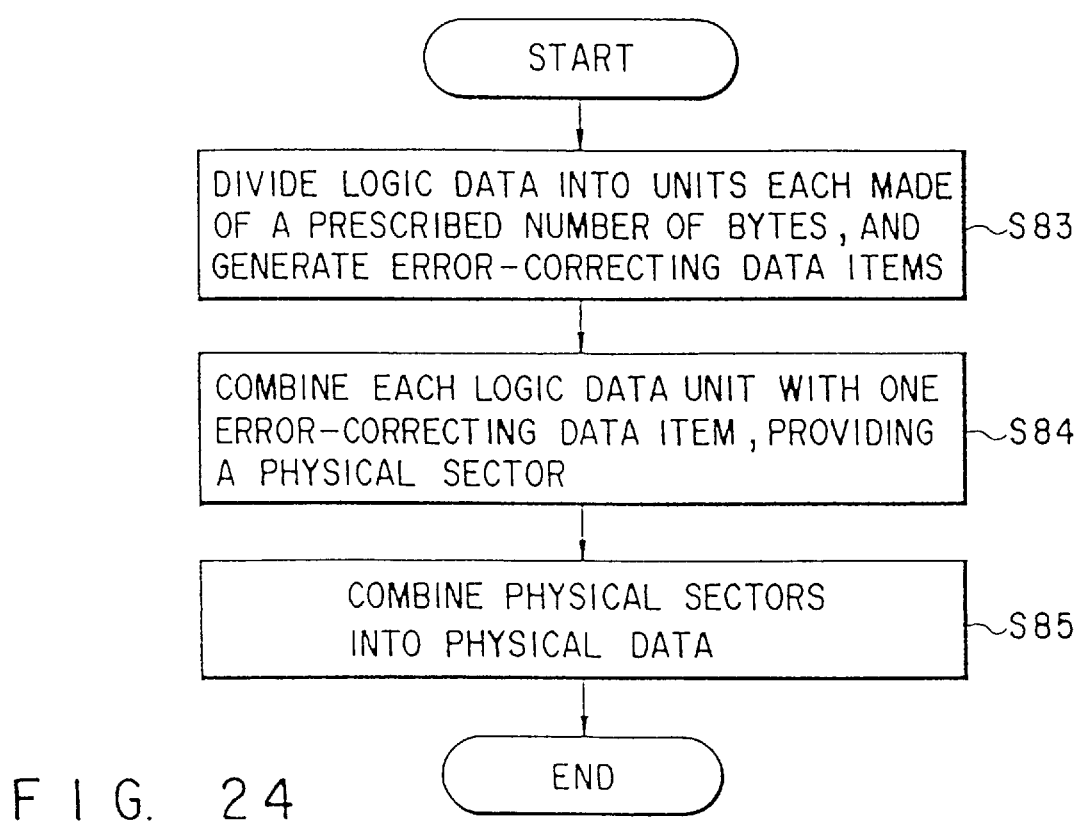
FIG. 24 is a flowchart showing how physical data to be recorded on a disk is prepared from logic data.

After the conversion, the flow as shown in FIG. 24 for preparing physical data to be recorded on the disk is executed. As indicated in step S83, logic data is segmented to a given number of bytes to produce error correction data. In the next step S84, the logic data segmented to the given number of bytes and the produced error correction data are combined to prepare physical sectors. Then, the physical sectors are linked to prepare physical data as described in step S85. It is apparent from the above that a modulation process based on given rules is executed on the physical data which has been prepared by the flow illustrated in FIG. 25 to thereby prepare record data. Then, the record data is recorded on the disk 10. This disk 10 becomes a master disk from which multiple optical disks can be copied.

In the above-described embodiment, the pit rows in the first to fifth groups should not necessarily be recorded in the lead-in area 27 and the lead-out area 26 in the named order, but may be recorded in any order as long as they can be distinguished physically. If the evaluation of the manufactured optical disk 10, which will be discussed shortly, is not carried out, the pit rows from the first to fourth groups may not be recorded on the optical disk 10. If only the evaluation of the optical disk is to be performed, requiring no tilt compensation, the pit row of the fifth group need not be formed.

Figure 25:
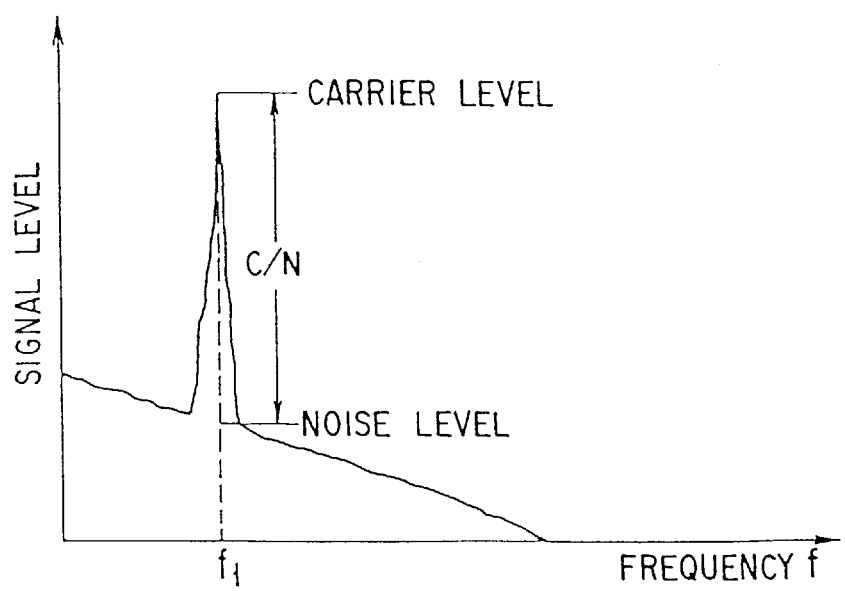
FIG. 25 is a graph for explaining a C/N ratio which is a ratio of a carrier level to a noise level.

A description will now be given of how to evaluate the optical disk which has been manufactured by the above-described method. First, the optical disk 10, which has been manufactured in the above-describe manner is loaded in the retrieving apparatus, and the reproduction signals of the first to fourth groups of the first test pattern are acquired. The properness of the thus manufactured optical disk 10 is evaluated from those signal waveforms as follows. The properness of the formation of the individual pits is evaluated from the signal waveform equivalent to the longest pit (nT+*nT). As long as the pits are formed accurately, the signal waveform equivalent to the longest pit (nT+*nT) has a relatively large pulse width, a level change between the rising and falling is small and the rising and falling become clear as shown in FIG. 5B. When this signal waveform is cut or unclear, therefore, the formation of the pits is considered inadequate and the manufactured optical disk 10 is considered as defective. Whether or not pits are formed to be clearly distinguished from the non-pit areas between the pits is evaluated from the signal waveform equivalent to the shortest pit (mT+*mT). A noise level (N) and a carrier level (C) equivalent to the peak level of the reproduction signal are acquired from the reproduction signal shown in FIG. 6B, as shown in FIG. 25, and the properness of the formation of the pit rows is determined by the C/N ratio. When this C/N ratio is small, the carrier corresponding to a pit cannot be distinguished from noise corresponding to a defect or the like on the optical disk 10. When this C/N ratio is small, therefore, it is considered that the manufactured optical disk 10 is defective. As the pit row of the third group is converted to a reproduction signal using a light beam, an MTF signal as shown in FIG. 7 is acquired and the frequency characteristic of the reproducing system for the pit row of the third group as shown in FIG. 26 is obtained from the MTF signal as has been explained earlier. This frequency characteristic is deteriorated when the optical disk 10 is deformed, is eccentric or the like. By determining this frequency characteristic, therefore, the properness of the physical characteristic of the optical disk 10 can be determined.

Further, because the pit row of the fourth group includes the pit length row (mT+*mT) equivalent to the center track and the pit length rows [(m+1)T+*(m+1)T)] and [(m+2)T+*(m+2)T)] equivalent to the adjoining tracks, as shown in FIG. 8, the crosstalk from the adjacent tracks which is included in the reproduction signal can be evaluated. The amount of crosstalk Ct (=At−Br (dB)) is equivalent to the amplitude At of the reproducing track (corresponding to the center track) minus the amplitude Br of the adjoining track. In other words, at the time the pit length row (mT+*mT) equivalent to the center track is reproduced, the frequencies fr1 and fr2 of the pit length rows [(m+1)T+*(m+1)T)] and [(m+2)T+*(m+2)T)] equivalent to the adjoining tracks appear, and the difference between the main signal level of the bit length row (mT+*mT) having a frequency fc and the signal levels of the pit length rows [(m+1)T+*(m+1)T)] and [(m+2)T+*(m+2)T)] equivalent to the adjoining tracks which have those frequencies fr1 and fr2 can be detected as the crosstalk amount. When this crosstalk amount is large, it is possible to sufficiently discriminate the retrieving track from the adjoining tracks. When this crosstalk amount is small, however, it is not possible to discriminate the retrieving track from the adjacent tracks. When the crosstalk amount is equal to or smaller than a predetermined value, the optical disk 10 is determined as defective.

Figure 17:
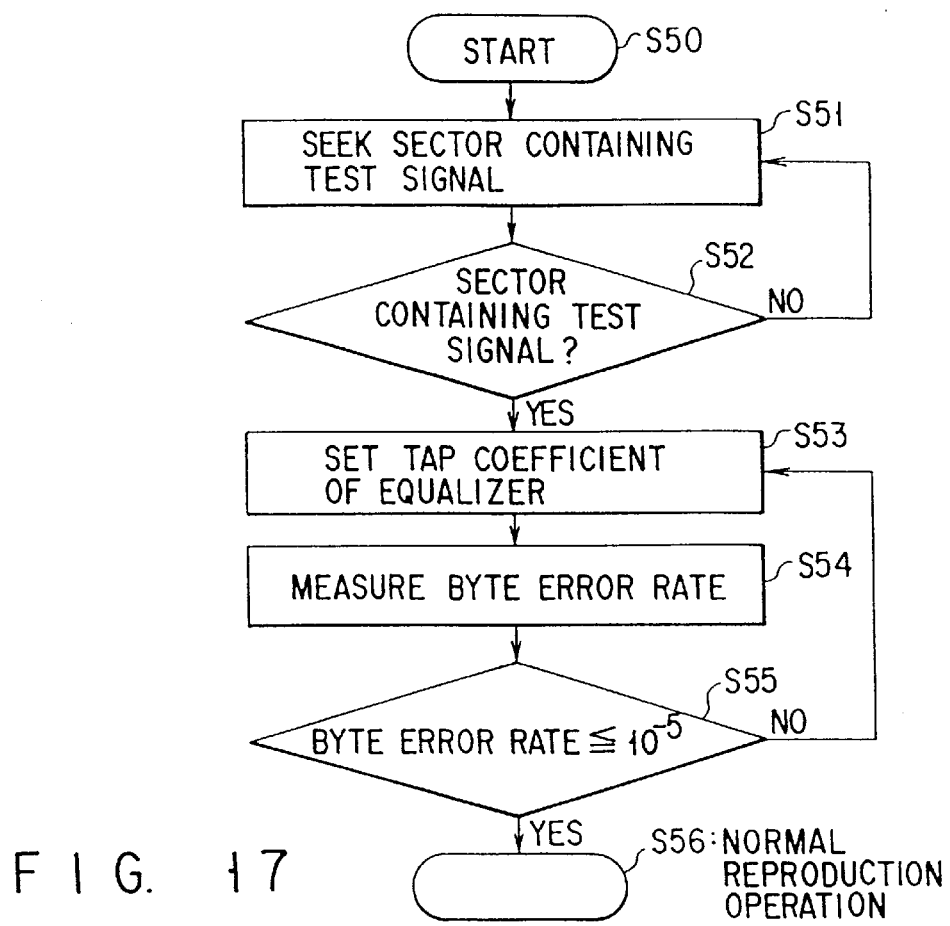
FIG. 17 is a flowchart illustrating how the compensation circuit shown in FIG. 16 compensates a reproduction signal using the evaluation pattern shown in FIG. 14A.

In evaluating the optical disk 10 using the 3-6-7 evaluation pattern, this optical disk 10 is determined as defective if the byte error rate does not fall within $10^{-5}$ even when the tap coefficients of the transversal filter 104 are change in step S55 in the flowchart illustrated in FIG. 17.

In short, even if a relative tilt occurs between the disk's reproducing surface and the surface of the object lens, the frequency characteristic of the reproduction equalizer (transversal filter) can be optimized to improve the characteristic of the reproduction signal by optimizing the individual tap coefficients of the reproduction equalizer in accordance with the tilt amount. It is thus possible to eventually improve the error rate at the time of reading data. Moreover, as no mechanical components such as the motor and gear are not intervened in the control system, it is easy to widen the band and ensure a wide control band, so that this invention is suitable for making the optical disk retrieving apparatus compact.

What is claimed is:

1. An optical disk retrieving apparatus comprising:

reading means for optically reading a test pattern and data stored in the optical disk as reproduction signals from the optical disk, the optical disk including:

a data area having pits and lands arranged in accordance with record data such that the data area includes the data recorded as a pattern of the pits and the lands, the pits having one of a shortest pit length (3T), a longest pit length (kT) and a pit length between the shortest pit length (3T) and the longest pit length (kT), where T is a channel pit length, 3<m<n<k, and n, m and k are integers, the lands having one of a shortest non-pit length (*3T), a longest non-pit length (*kT) and a non-pit length between the shortest non-pit length (*3T) and the longest non-pit length (*kT), and a test pattern area provided outside the data area and having the pits and lands arranged based on a predetermined arrangement rule including a repetition of predetermined arrangements of the pits and lands in succession, each arrangement comprising:

a first pit with a pit length of one of 3T, mT, and nT, a first land with a land length of one of *3T, *mT, and *nT, a second pit with a pit length of a remaining one of 3T, mT, and nT not used to define the length of the first pit, a second land with a land length of a remaining one of *3T, *mT, and *nT not used to define the length of the first land, a third pit with a pit length of a last remaining one of 3T, mT, and nT not used to define the length of the first and the second pit, and a third land with a land length of a last remaining one of *3T, *mT, and *nT not used to define the length of the first and the second land.

2. The optical disk retrieving apparatus according to claim 1, wherein:

the data area is defined between a lead-in area in an inner track area of the optical disk and a lead-out area in an outer track area, and the test pattern area is provided in the lead-in area of the optical disk.

3. The optical disk retrieving apparatus according to claim 1, wherein:

m and n≧6, and m and n≦14=k.

4. The optical disk retrieving apparatus according to claim 1, wherein:

the pits have one of a shortest pit length 3T, a longest pit length 14T and a predetermined pit length 4T, 5T, 6T, 7T, 8T, 9T, 10T, 11T, 12T and 13T between the shortest pit length 3T and the longest pit length 14T, and the lands have one of a shortest non-pit length *3T, a longest non-pit length *14T and a predetermined non-pit length *4T, *5T, *6T, *7T, *8T, *9T, *10T, *11T, *12T and *13T between the shortest non-pit length *3T and the longest non-pit length *14T.

5. The optical disk retrieving apparatus according to claim 1, wherein:

the first pit has a pit length of 3T, the first land has a land length of *6T, the second pit has a pit length of 7T, the second land has a land length of *3T, the third pit has a pit length of 6T, and the third land has a land length of *7T.

6. The optical disk retrieving apparatus according to claim 1, wherein:

a pattern of pits with pit length 3T, lands with a land length of *6T and pits with a pit length of 7T is equivalent to a code word 0010000010000001.

7. The optical disk retrieving apparats according to claim 1, wherein:

m=6 and n=7 and the lengths of the first pit, the first land, the second pit, the second land, the third pit and the third land, respectively, in the arrangement of the pits and lands is selected from a group consisting of 3T-*6T-7T-*3T-6T-*7T, 3T-*7T-6T-*3T-6T-*7T, 6T-*3T-7T-*6T-3T-*7T, 7T-*3T-6T-*7T-3T-*6T, 6T-*7T-3T-*6T-7T-*3T, and 7T-*6T-3T-*7T-6T-*3T.

8. An optical disk playing method comprising:

providing an optical disk comprising:

a data area having pits and lands arranged in accordance with record data such that the data area includes the data recorded as a pattern of the pits and the lands, said pits having one of a shortest pit length (3T), a longest pit length (kT) and a pit length between the shortest pit length (3T) and the longest pit length (kT), where T is a channel pit length, 3<m<n<k, and n, m and k are integers, the lands having one of a shortest non-pit length (*3T), a longest non-pit length (*kT) and a non-pit length between the shortest non-pit length (*3T) and the longest non-pit length (*kT), and a test pattern area provided outside the data area and having the pits and lands arranged based on a predetermined arrangement rule including a repetition of predetermined arrangements of the pits and lands in succession, each arrangement comprising:

a first pit with a pit length of one of 3T, mT, and nT, a first land with a land length of one of *3T, *mT, and *nT, a second pit with a pit length of a remaining one of 3T, mT, and nT not used to define the length of the first pit, a second land with a land length of a remaining one of *3T, *mT, and *nT not used to define the length of the first land, a third pit with a pit length of a last remaining one of 3T, mT, and nT not used to define the length of the first and the second pit, and a third land with a land length of a last remaining one of *3T, *mT, and *nT not used to define the length of the first and the second land;

optically reading the test pattern and the data as reproduction signals from the optical disk.

9. The optical disk playing method according to claim 8, wherein:

the data area is defined between a lead-in area in an inner track area of the optical disk and a lead-out area in an outer track area, and the test pattern area is provided in the lead-in area of the optical disk.

10. The optical disk playing method according to claim 8, wherein:

m and n≧6, and m and n≦14=k.

11. The optical disk playing method according to claim 8, wherein:

the pits have one of a shortest pit length 3T, a longest pit length 14T and a predetermined pit length 4T, 5T, 6T, 7T, 8T, 9T, 10T, 11T, 12T and 13T between the shortest pit length 3T and the longest pit length 14T, and the lands have one of a shortest non-pit length *3T, a longest non-pit length *14T and a predetermined non-pit length *4T, *5T, *6T, *7T, *8T, *9T, *10T, *11T, *12T and *13T between the shortest non-pit length *3T and the longest non-pit length *14T.

12. The optical disk playing method according to claim 8, wherein:

the first pit has a pit length of 3T, the first land has a land length of *6T, the second pit has a pit length of 7T, the second land has a land length of *3T, the third pit has a pit length of 6T, and the third land has a land length of *7T.

13. The optical disk playing method according to claim 8, wherein:

a pattern of pits with pit length 3T, lands with a land length of *6T and pits with a pit length of 7T is equivalent to a code word 0010000010000001.

14. The optical disk playing method according to claim 8, wherein:

m=6 and n=7 and the lengths of the first pit, the first land, the second pit, the second land, the third pit and the third land, respectively, in the arrangement of the pits and lands is selected from a group consisting of 3T-*6T-7T-*3T-6T-*7T, 3T-*7T-6T-*3T-6T-*7T, 6T-*3T-7T-*6T-3T-*7T, 7T-*3T-6T-*7T-3T-*6T, 6T-*7T-3T-*6T-7T-*3T, and 7T-*6T-3T-*7T-6T-*3T.

15. A recording method of recording data on an optical disk comprising:

a data conversion step of converting data to be recorded in a data area of the optical disk to a pattern of pits and lands, the pits having one of a shortest pit length (3T), a longest pit length (kT), and a pit length between the shortest pit length (3T) and the longest pit length (kT), where T is a channel pit length, 3<m<n<k and n, m and k are integers, the lands having one of a shortest non-pit length (*3T), a longest non-pit length (*kT) and a non-pit length between the shortest non-pit length (*3T) and the longest non-pit length (*kT);

a step of preparing a test signal equivalent to a test pattern to be provided on the optical disk outside the data area and having the pits and lands arranged based on a predetermined arrangement rule including a repetition of predetermined arrangements of the pits and lands in succession, each arrangement comprising:

a first pit with a pit length of one of 3T, mT, and nT, a first land with a land length of one of *3T, *mT, and *nT, a second pit with a pit length of a remaining one of 3T, mT, and nT not used to define the length of said first pit, a second land with a land length of a remaining one of *3T, *mT, and *nT not used to define the length of the first land, a third pit with a pit length of a last remaining one of 3T, mT, and nT not used to define the length of the first and the second pit, and a third land with a land length of a last remaining one of *3T, *mT, and *nT not used to define the length of the first and the second land; and a step of recording the data in the data area on the optical disk and the test signal in the test pattern area different from the data area on the optical disk, both the data and the test signal being recorded as a pattern of the pits and the lands.

16. The recording method according to claim 15, wherein:

the data area is defined between a lead-in area in an inner track area of the optical disk and a lead-out area in an outer track area, and the test pattern area is provided in the lead-in area of the optical disk.

17. The recording method according to claim 15, wherein: m and n≧6, and m and n≦14=k.

18. The recording method according to claim 15, wherein:

the pits have one of a shortest pit length 3T, a longest pit length 14T and a predetermined pit length 4T, 5T, 6T, 7T, 8T, 9T, 10T, 11T, 12T and 13T between the shortest pit length 3T and said longest pit length 14T, and the lands have one of a shortest non-pit length *3T, a longest non-pit length *14T and a predetermined non-pit length *4T, *5T, *6T, *7T, *8T, *9T, *10T, *11T, *12T and *13T between the shortest non-pit length *3T and the longest non-pit length *14T.

19. The recording method according to claim 15, wherein:

the fist pit has a pit length of 3T, the first land has a land length of *6T, the second pit has a pit length of 7T, the second land has a land length of *3T, the third pit has a pit length of 6T, and the third land has a land length of *7T.

20. The recording method according to claim 15, wherein:

a pattern of pits with pit length 3T, lands with a land length of *6T and pits with a pit length of 7T is equivalent to a code word 0010000010000001.

21. The recording method according to claim 15, wherein:

m=6 and n=7 and the lengths of the first pit, the first land, the second pit, the second land, the third pit and the third land, respectively, in the arrangement of the pits and lands is selected from a group consisting of 3T-*6T-7T-*3T-6T-*7T, 3T-*7T-6T-*3T-6T-*7T, 6T-*3T-7T-*6T-3T-*7T, 7T-*3T-6T-*7T-3T-*6T, 6T-*7T-3T-*6T-7T-*3T, and 7T-*6T-3T-*7T-6T-*3T.

22. A recording apparatus for recording data on an optical disk comprising:

data conversion means for converting data to be recorded in a data area of the optical disk to a pattern of pits and lands, the pits having one of a shortest pit length (3T), a longest pit length (kT) and a pit length between the shortest pit length (3T) and the longest pit length (kT) where T is a channel pit length, 3<m<n<k and n, m and k are integers, the lands having one of a shortest non-pit length (*3T), a longest non-pit length (*kT) and a non-pit length between the shortest non-pit length (*3T) and the longest non-pit length (*kT);

means for preparing a test signal equivalent to a test pattern to be provided on the optical disk outside the data area and having the pits and lands arranged based on a predetermined arrangement rule including a repetition of predetermined arrangements of the pits and lands in succession, each arrangement comprising:

a first pit with a pit length of one of 3T, mT, and nT, a first land with a land length of one of *3T, *mT, and *nT, a second pit with a pit length of a remaining one of 3T, mT, and nT not used to define the length of the first pit, a second land with a land length of a remaining one of *3T, *mT, and *nT not used to define the length of the first land, a third pit with a pit length of a last remaining one of 3T, mT, and nT not used to define the length of the first and the second pit, and a third land with a land length of a last remaining one of *3T, *mT, and *nT not used to define the length of the first and the second land; and recording means for recording the data in the data area on the optical disk and the test signal in the test pattern area different from the data area on the optical disk, both the data and the test signal being recorded as a pattern of the pits and the lands.

23. The recording apparatus according to claim 22, wherein:

the data area is defined between a lead-in area in an inner track area of the optical disk and a lead-out area in an outer track area, and the test pattern area is provided in the lead-in area of the optical disk.

24. The recording apparatus according to claim 22, wherein:

m and n≧6, and m and n≦14=k.

25. The recording apparatus according to claim 22, wherein:

the pits have one of a shortest pit length 3T, a longest pit length 14T and a predetermined pit length 4T, 5T, 6T, 7T, 8T, 9T, 10T, 11T, 12T and 13T between the shortest pit length 3T and the longest pit length 14T, and the lands have one of a shortest non-pit length *3T, a longest non-pit length *14T and a predetermined non-pit length *4T, *5T, *6T, *7T, *8T, *9T, *10T, *11T, *12T and *13T between the shortest non-pit length *3T and the longest non-pit length *14T.

26. The recording apparatus according to claim 22, wherein:

the first pit has a pit length of 3T, the first land has a land length of *6T, the second pit has a pit length of 7T, the second land has a land length of *3T, the third pit has a pit length of 6T, and the third land has a land length of *7T.

27. The recording apparatus according to claim 22, wherein:

a pattern of pits with pit length 3T, lands with a land length of *6T and pits with a pit length of 7T is equivalent to a code word 0010000010000001.

28. The recording apparatus according to claim 22, wherein:

m=6 and n=7 and the lengths of the first pit, the first land, the second pit, the second land, the third pit and the third land, respectively, in the arrangement of the pits and lands is selected from a group consisting of 3T-*6T-7T-*3T-6T-*7T, 3T-*7T-6T-*3T-6T-*7T, 6T-*3T-7T-*6T-3T-*7T, 7T-*3T-6T-*7T-3T-*6T, 6T-*7T-3T-*6T-7T-*3T, and 7T-*6T-3T-*7T-6T-*3T.

29. The optical disk according to claim 1, wherein:

the test pattern area also includes a header describing a physical sector address which indicates that data recorded in the test pattern area is test pattern data, and wherein the test pattern follows the header.

30. The optical disk according to claim 1, wherein:

one of mT and nT corresponds to k/2, wherein k is an even number, and |m−n|=1.

31. The optical disk according to claim 8, wherein:

the test pattern area also includes a header describing a physical sector address which indicates that data recorded in the test pattern area is test pattern data, and wherein the test pattern follows the header.

32. The optical disk according to claim 8, wherein:

one of mT and nT corresponds to k/2, wherein k is an even number, and |m−n|=1.

33. The optical disk according to claim 15, wherein:

the test pattern area also includes a header describing a physical sector address which indicates that data recorded in the test pattern area is test pattern data, and wherein the test pattern follows the header.

34. The optical disk according to claim 15, wherein:

one of mT and nT corresponds to k/2, wherein k is an even number, and |m−n|=1.

35. The optical disk according to claim 22, wherein:

the test pattern area also includes a header describing a physical sector address which indicates that data recorded in the test pattern area is test pattern data, and wherein the test pattern follows the header.

36. The optical disk according to claim 22, wherein:
one of mT and nT corresponds to k/2, wherein k is an even number, and |m−n|=1.

37. The apparatus of claim 1, further comprising:
detection means for detecting an error rate of a reproduction signal read from the test pattern.

38. The apparatus of claim 37, further comprising:
compensation means for compensating a reproduction signal so as to minimize the error rate.

39. The method of claim 8, further comprising:
detecting an error rate of a reproduction signal read from the test pattern.

40. The method of claim 39, further comprising:
compensating a reproduction signal so as to minimize the error rate.

* * * * *